(12) United States Patent
Pan et al.

(10) Patent No.: US 6,795,242 B2
(45) Date of Patent: Sep. 21, 2004

(54) MINIATURE CIRCULATOR DEVICES AND METHODS FOR MAKING THE SAME

(75) Inventors: Jing-Jong Pan, Milpitas, CA (US); Ming Zhou, San Jose, CA (US); Hong-Xi Zhang, San Jose, CA (US); Feng-Qing Zhou, San Jose, CA (US)

(73) Assignee: Lightwaves 2020, Inc., Milpitas, CA (US)

( * ) Notice: Subject to any disclaimer, the term of this patent is extended or adjusted under 35 U.S.C. 154(b) by 0 days.

(21) Appl. No.: 10/068,796

(22) Filed: Feb. 6, 2002

(65) Prior Publication Data

US 2003/0147136 A1 Aug. 7, 2003

(51) Int. Cl.[7] ............................................. G02B 27/28
(52) U.S. Cl. ....................... 359/484; 359/496; 359/497; 385/11
(58) Field of Search ................................. 359/484, 280, 359/494, 496, 497, 495, 500, 282; 372/703; 385/11

(56) References Cited

U.S. PATENT DOCUMENTS

| | | | |
|---|---|---|---|
| 4,874,664 A | 10/1989 | Hamaguchi et al. | 428/325 |
| 5,204,771 A | 4/1993 | Koga | 359/281 |
| 5,208,876 A | 5/1993 | Pan | 385/11 |
| 5,212,586 A | 5/1993 | Van Delden | 359/281 |
| 5,471,340 A | 11/1995 | Cheng et al. | 359/281 |
| 5,574,596 A | 11/1996 | Cheng | 359/484 |
| 5,594,825 A | 1/1997 | Kawasaki et al. | 385/60 |
| 5,640,516 A * | 6/1997 | Iwatsuka et al. | 359/280 |
| 5,682,446 A | 10/1997 | Pan et al. | 385/11 |
| 5,689,367 A | 11/1997 | Pan et al. | 359/495 |
| 5,689,593 A | 11/1997 | Pan et al. | 358/11 |
| 5,801,875 A | 9/1998 | Brandle, Jr. et al. | 359/321 |
| 5,872,878 A | 2/1999 | Bergmann | 385/15 |
| 5,898,516 A | 4/1999 | Shirai et al. | 359/324 |
| 5,909,310 A | 6/1999 | Li et al. | 359/484 |
| 5,932,354 A * | 8/1999 | Takeda et al. | 428/426 |
| 5,936,768 A | 8/1999 | Oguma | 359/484 |
| 6,002,512 A | 12/1999 | Bergmann et al. | 359/281 |
| 6,014,475 A | 1/2000 | Frisken | 385/11 |
| 6,014,483 A | 1/2000 | Thual et al. | 385/33 |
| 6,049,426 A * | 4/2000 | Xie et al. | 359/484 |
| 6,052,228 A | 4/2000 | Xie et al. | 359/496 |
| 6,064,522 A | 5/2000 | Bergmann et al. | 359/484 |
| 6,097,868 A | 8/2000 | Tardy et al. | 385/126 |
| 6,212,008 B1 | 4/2001 | Xie et al. | 359/484 |
| 6,396,629 B1 | 5/2002 | Cao | 359/484 |
| 6,404,549 B1 | 6/2002 | Huang et al. | 359/484 |
| 6,441,961 B1 | 8/2002 | Hou et al. | 359/497 |

* cited by examiner

*Primary Examiner*—Thong Nguyen
*Assistant Examiner*—Arnel C. Lavarias
(74) *Attorney, Agent, or Firm*—Ritter, Lang & Kaplan LLP

(57) ABSTRACT

Miniature optical devices, including circulator array devices, are fabricated using thin film coating technology. A typical optical device includes two refraction elements arranged opposite each other along a propagation axis and coupled on opposite ends to first and second polarization orientation elements with first and second PBS elements are coupled to the first and second polarization orientation elements, respectively. The refraction elements include complementary Wollaston Prism elements or Rochon Prism elements. Each polarization orientation element includes a Faraday rotator element, and in some embodiments, a half-wave plate formed using thin film coating techniques. The Faraday rotator elements are periodically poled in some embodiments using selective poling techniques to create oppositely oriented magnetic domains so that polarization rotations of 45° in both clockwise and counter-clockwise directions can be simultaneously achieved on the same magnetic garnet. Periodically etched half-wave plates are used in some embodiments.

19 Claims, 17 Drawing Sheets

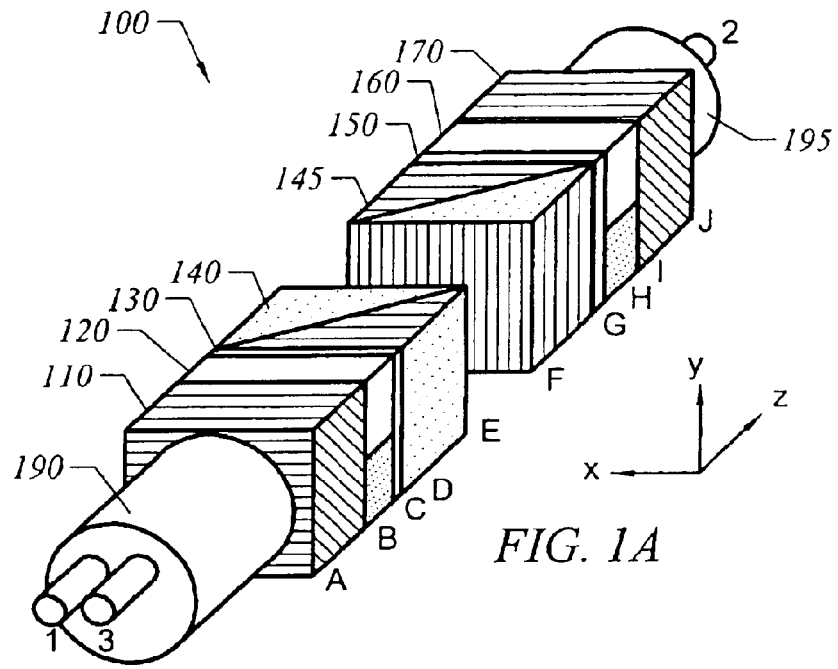
*FIG. 1A*
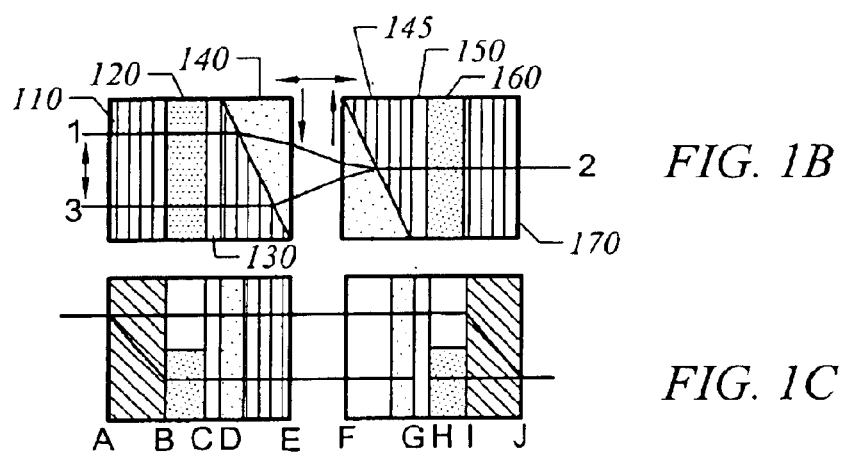
*FIG. 1B*
*FIG. 1C*
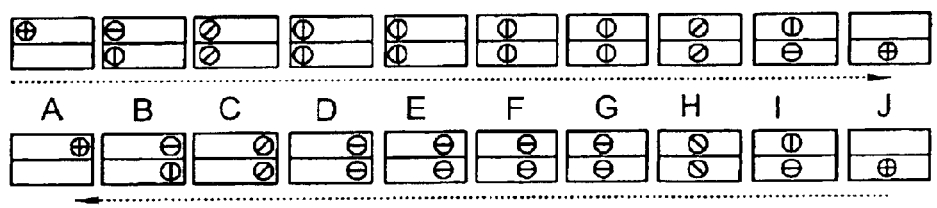
*FIG. 1D*

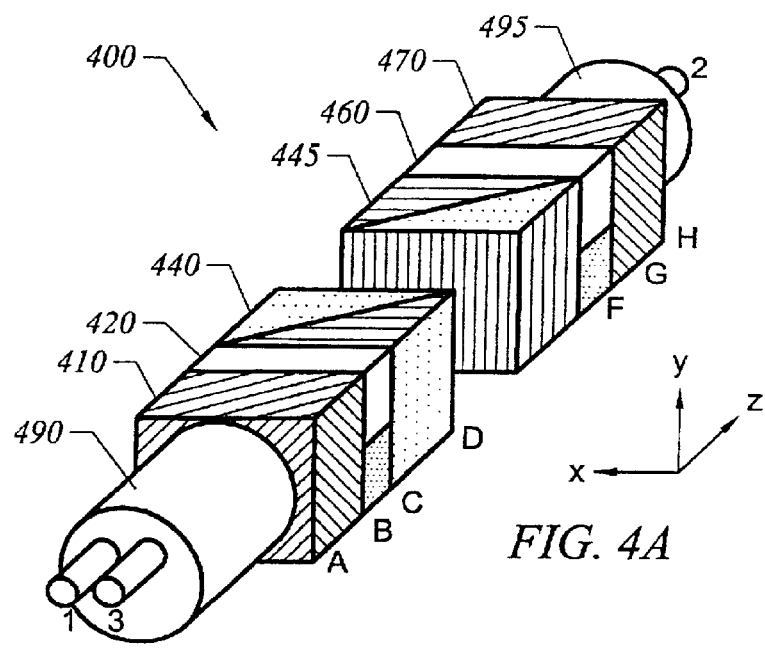
*FIG. 4A*
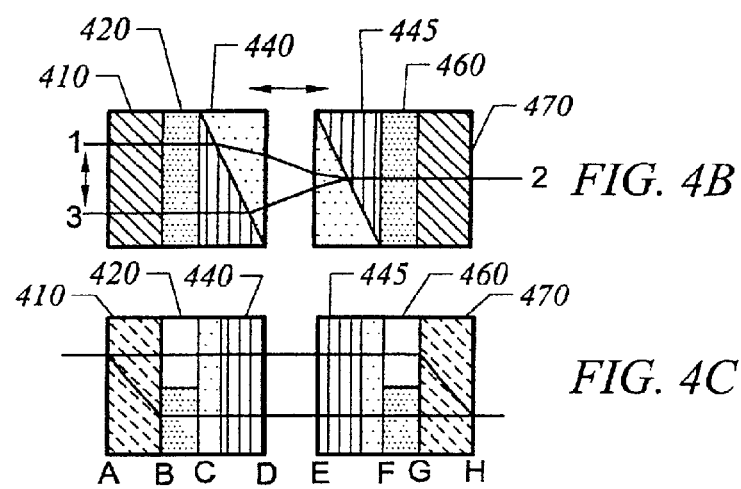
*FIG. 4B*
*FIG. 4C*
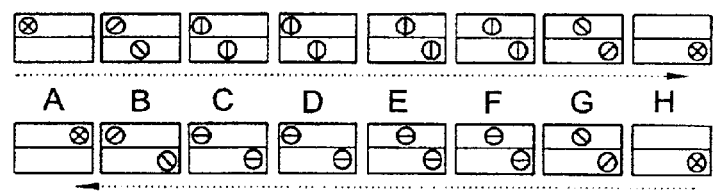
*FIG. 4D*

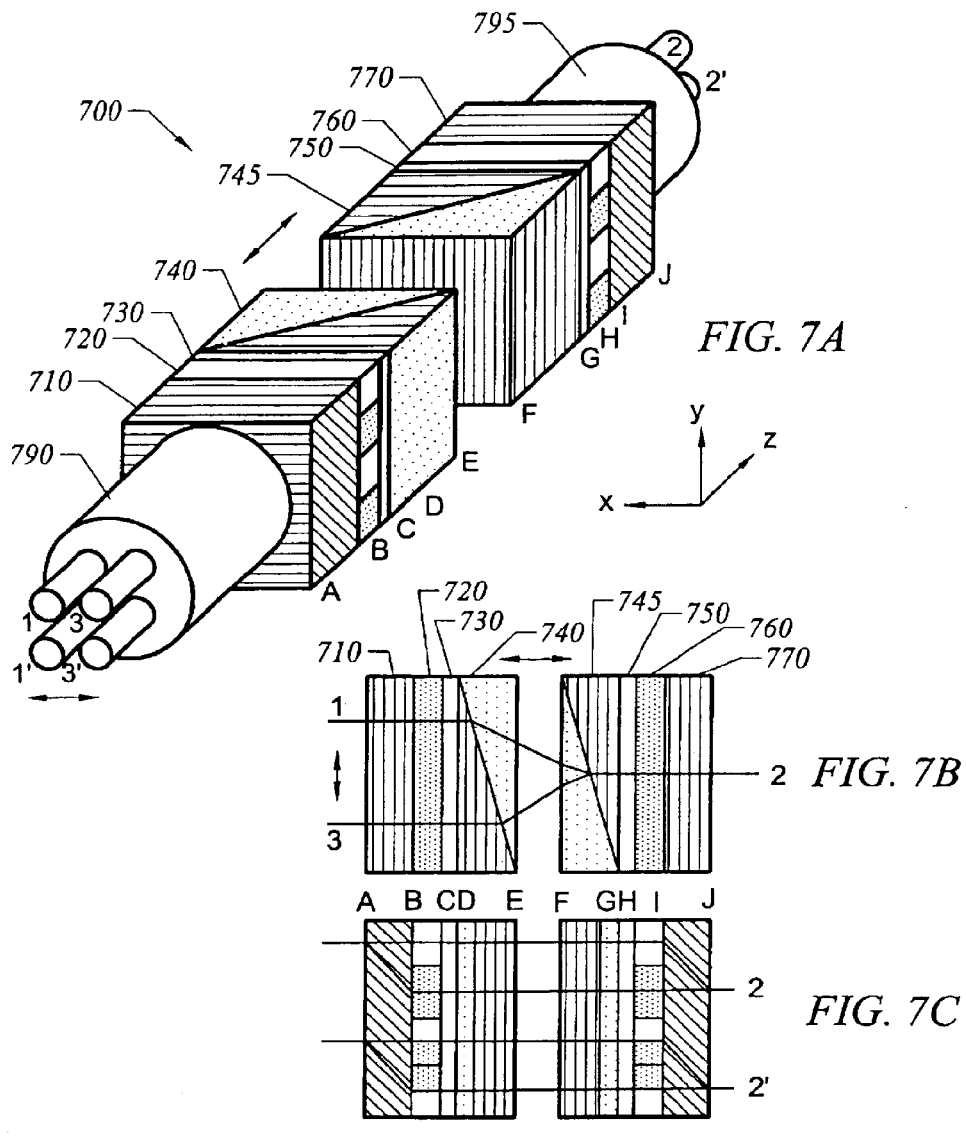
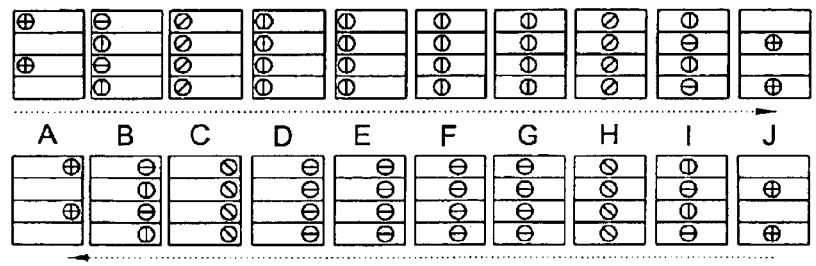
FIG. 7D

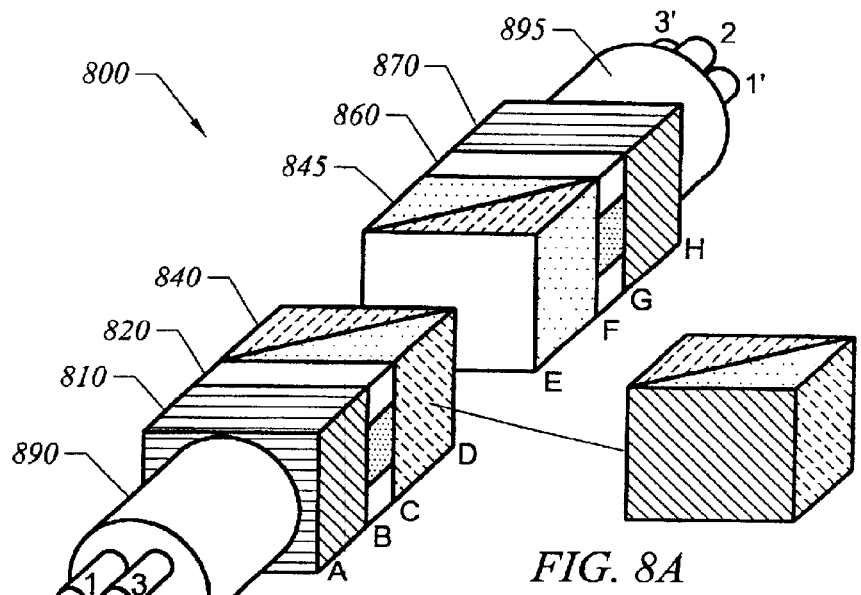
FIG. 8A
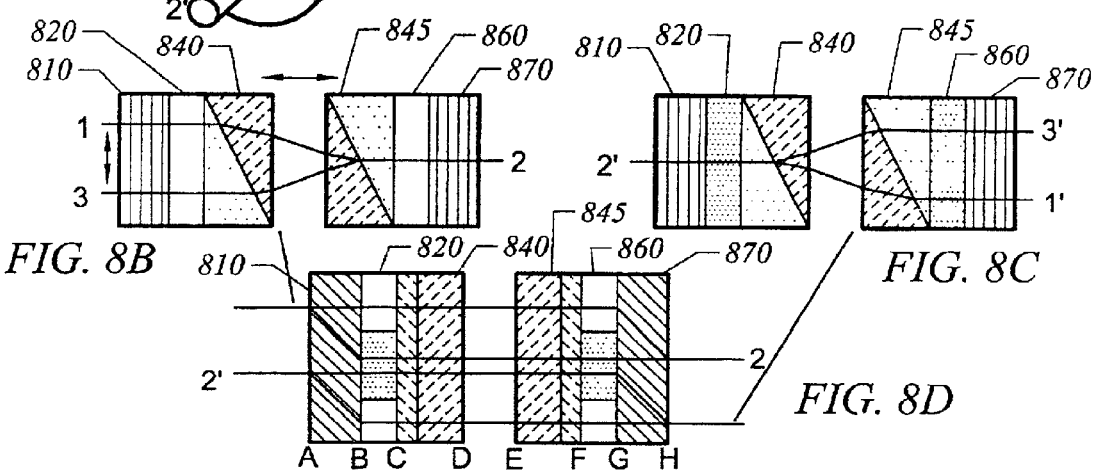
FIG. 8B  FIG. 8C
FIG. 8D
FIG. 8E

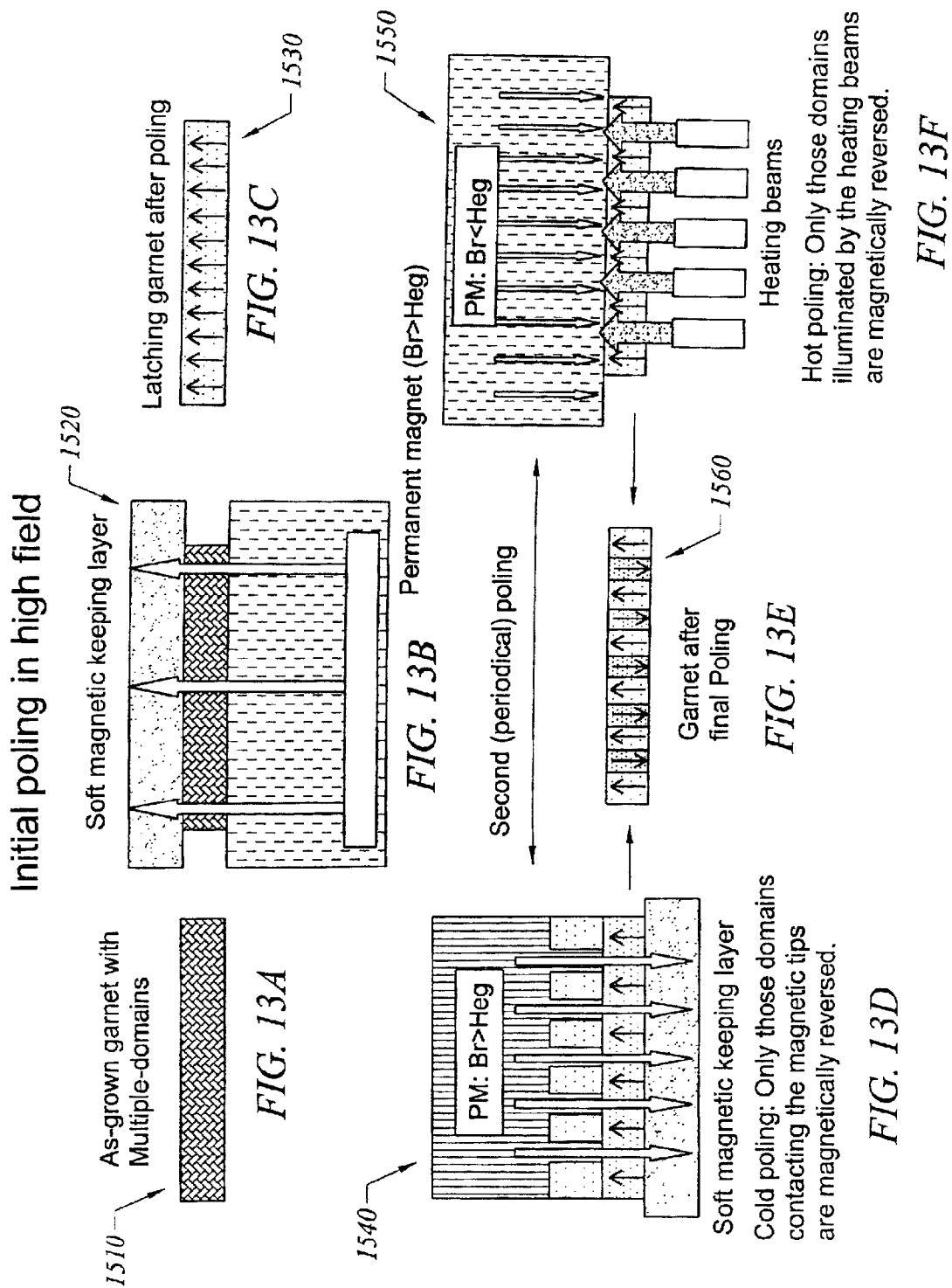

Magnetic (Periodic) Poling of Faraday Rotator

Cross section

Sample (Bottom view)

Optional: Cut thin gaps to isolate neighboring domains.

Multi-pole

Single pole non-magnetic material

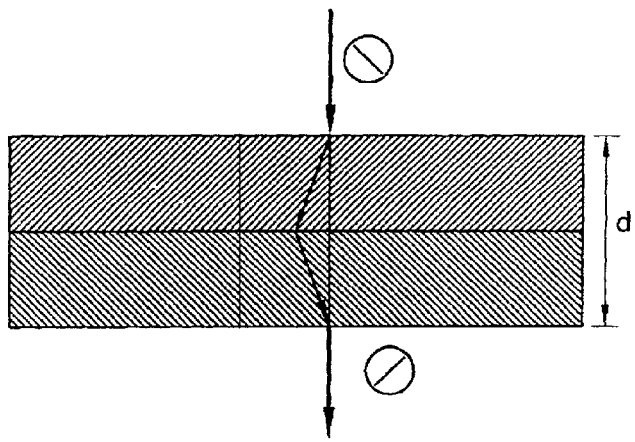

Waveplate from bi-directionally obliquely deposited films

Half wave plate : $\Delta n \cdot d = \lambda/2$

The half-wave plate is capable of rotating a linearly polarized light by 2 θ(where θ is the direction of polarization with respect to the optical axis before entering the wave plate).

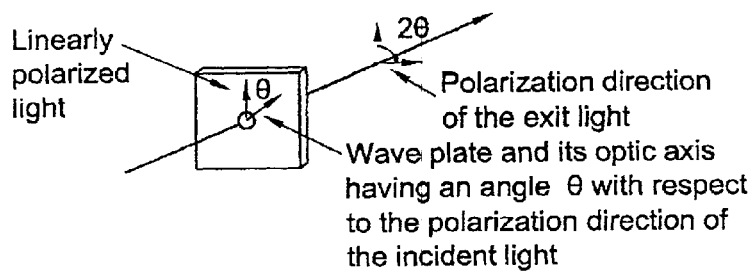

Linearly polarized light

Polarization direction of the exit light

Wave plate and its optic axis having an angle θ with respect to the polarization direction of the incident light

FIG. 15

MINIATURE CIRCULATOR DEVICES AND METHODS FOR MAKING THE SAME

CROSS-REFERENCES TO RELATED APPLICATIONS

This application is related to U.S. patent application Ser. No. 10/068,794, filed concurrently herewith, entitled "MINIATURE CIRCULATOR ARRAY DEVICES AND METHODS FOR MAKING THE SAME", the disclosure of which is hereby incorporated by reference in its entirety.

BACKGROUND OF THE INVENTION

The present invention relates in general to optical devices such as optical circulators and optical isolators, and more particularly to optical devices that can be configured as an optical circulator having three, four or any number of optical ports, or as an optical isolator having two optical ports.

As generally known, in an optical isolator, a signal in the forward direction is passed from a first optical port to a second optical port. An optical circulator is a non-reciprocal optical device which allows the passage of light from a first optical port to a second one (as in an optical isolator), while a reverse signal into the second port is totally transmitted to a third port and so on for the remaining port(s) for a so-called circulating operation. Any two consecutive ports of an optical circulator are, in effect, an optical isolator since signals travel only one way.

Optical circulator devices play key roles in fiber optical networking systems and devices, for example, in fiberoptic amplifiers, dense wavelength division multiplexing (DWDM) systems and components and optical add-drop module (OADM) components. Several types of optical circulators have been developed. Examples of current optical circulator devices include those disclosed in U.S. Pat. Nos. 5,204,771; 5,471,340; 5,872,878; 6,002,512; 6,064,522 and 6,052,228. However, manufacturing such conventional circulator devices typically requires precise alignment of each optical element, leading to a low yield and high production costs. Furthermore, such conventional circulator devices tend to be bulky and expensive.

It is, therefore, desirable to provide a compact circulator array that is cost-effective and easily manufactured, and which is capable of routing any number of input signals within one integrated circulating module. It is also desirable that an optical circulator module have optimum performance, i.e., very high isolation, very low polarization dependent loss (PDL), very low polarization mode dispersion (PMD), low insertion loss, very low cross-talk, and high power handling capability. An optical circulator should also be designed for mass production with simple assembly processes.

The present invention avoids many of the problems above and substantially achieves an optical circulator or isolator which has a very high performance and which is easily manufactured. The present invention presents optical devices which are useful for long distance and high data rate communication systems.

SUMMARY OF THE INVENTION

The present invention provides optical isolator and circulator devices, and methods for making the same, having two optical ports in isolator embodiments and three, four or any number of optical ports in circulator embodiments.

According to embodiments of the present invention, miniature optical devices, including circulator array devices, are fabricated using thin film coating technology. A typical optical device according to the present invention includes two complementary refraction elements arranged opposite each other along a propagation axis and coupled on opposite ends to first and second polarization orientation elements. First and second polarization beam splitter (PBS) elements are coupled to the first and second polarization orientation elements, respectively. The PBS elements are formed using thin film coating techniques and each includes an array of port coupling regions for coupling to an array of input/output fiber port assemblies. The complementary refraction elements include complementary Wollaston Prism elements or complementary Rochon Prism elements, and may be formed using thin film coating techniques or cut from birefringent crystals. Each polarization orientation element includes a Faraday rotator element, and in some embodiments, each also includes a half-wave plate formed using thin film coating techniques. The Faraday rotator elements are periodically poled in some embodiments using selective poling techniques to create oppositely oriented (bi-directional) magnetic domains so that polarization rotations of 45° in both clockwise and counter-clockwise directions can be simultaneously achieved on the same magnetic garnet. Periodically etched half-wave plates are used in some embodiments. Depending on the orientation of the refraction elements and the optical axes of the first and second PBS elements, the constituents of each polarization orientation element are designed and oriented so that the circulator device achieves a circulating operation with optical signals at an input port, i, coupled to one PBS element being passed to an output port, i+1, coupled to the other PBS element in a non-reciprocal manner. In some embodiments, a reflective element replaces one of the PBS elements so as to provide a circulator device having a reflective operation, with an optical signal at an input port, i, coupled to the PBS element being passed to the next consecutive port, i+1, coupled to the PBS element.

According to an aspect of the present invention, an optical circulator device for coupling three or more optical fiber ports is provided. The device typically comprises first and second refraction elements each having a refraction axis perpendicular to a propagation axis, wherein each refraction element is arranged so that light traveling in a forward direction parallel to the propagation axis and having a first linear polarization orientation is refracted by a first angle relative to the refraction axis along a refraction plane defined by the propagation and refraction axes, and light traveling in a forward direction parallel to the propagation axis and having a second linear polarization orientation perpendicular to the first polarization orientation is refracted by a second angle along the refraction plane opposite the first angle, wherein the first and second refraction elements are arranged opposite each other relative to the propagation axis, with anti-parallel refraction axes and with parallel refraction planes so that light refracted by one refraction element is refracted back parallel to the propagation axis by the other refraction element. The device also typically comprises first and second polarization orientation elements coupled to opposite ends of the first and second refraction elements, respectively, and first and second polarization beam splitting (PBS) films deposited on said first and second polarization orientation elements, respectively, wherein the end face of each of the first and second PBS films opposite the polarization orientation elements defines one or more port coupling regions each for coupling light signals from an optical fiber port, wherein the first and second PBS films are dimensioned and arranged so as to split a light signal in a forward direction into two parallel beams of light linearly polarized perpendicular to each other, and to combine parallel beams of light linearly polarized perpendicularly to each other in the reverse direction into a single beam of light. The first polarization orientation element is typically arranged with respect to the first refraction element and the first PBS film so as to orient the polarization of both of the parallel light beams of a first optical signal propagating along a forward direction from a first port coupling region on the first PBS film parallel to the first linear polarization orientation so that both beams are refracted by the first angle by the first refraction element, and to orient the polarization of two beams linearly polarized parallel to each other propagating in the reverse direction so that they are polarized perpendicular to each other. The second polarization orientation element is typically arranged with respect to the second refraction element and the second PBS film so as to orient the polarization of both of the parallel light beams of a second optical signal propagating along a forward direction from a second port coupling region on the second PBS film parallel to the second linear polarization orientation so that both beams are refracted by the second angle by the second refraction element, and to orient the polarization of two beams linearly polarized parallel to each other propagating in the reverse direction so that they are mutually perpendicular. In operation, therefore, the first optical signal passes from the first port coupling region to the second port coupling region, and the second optical signal passes from the second port coupling region to the third port coupling region.

According to another aspect of the present invention, an optical circulator device for coupling three or more optical fiber ports is provided. The device typically comprises first and second refraction elements each having a refraction axis perpendicular to a propagation axis, wherein each refraction element is arranged so that light traveling in a forward direction parallel to the propagation axis and having a first linear polarization orientation is refracted by a first angle relative to the refraction axis along a refraction plane defined by the propagation and refraction axes, and light traveling in a forward direction parallel to the propagation axis and having a second linear polarization orientation perpendicular to the first polarization orientation is refracted by a second angle along the refraction plane opposite the first angle, wherein the first and second refraction elements are arranged opposite each other relative to the propagation axis, with anti-parallel refraction axes and with parallel refraction planes so that light refracted by one refraction element is refracted back parallel to the propagation axis by the other refraction element. The device also typically includes first and second polarization orientation elements coupled to opposite ends of the first and second refraction elements, respectively, and a polarization beam splitting (PBS) film deposited on said first polarization orientation element, wherein the end face of the PBS film opposite the first polarization orientation element defines three or more port coupling regions for coupling light signals from two or more optical fiber ports, wherein the PBS film is dimensioned and arranged so as to split a light signal in a forward direction into two parallel beams of light linearly polarized perpendicular to each other, and to combine parallel beams of light linearly polarized perpendicularly to each other in the reverse direction into a single beam of light. A reflection element is coupled to the second polarization orientation element opposite the second refraction element, wherein the reflection element is arranged such that the beam components of a light signal propagating in the forward direction are reflected back in the reverse direction. The first polarization orientation element is typically arranged with respect to the first refraction element and the PBS film so as to orient the polarization of both of the parallel light beams of a first optical signal propagating along a forward direction from a first port coupling region on the PBS film parallel to the first linear polarization orientation so that both beams are refracted by the first angle by the first refraction element, and to orient the polarization of two beams linearly polarized parallel to each other propagating in the reverse direction so that they are polarized perpendicular to each other. The second polarization orientation element rotates the polarization state of each of the parallel light beams of the first optical signal propagating along the forward direction by 45° in one direction, and wherein the second polarization orientation element rotates, by 45° in the same direction, the polarization state of both of the parallel light beams of the first optical signal propagating along the reverse direction after being reflected by the reflection element such that both beams are parallel to the second linear polarization orientation, and such that both beams are refracted by the second angle by the second refraction element. In operation, therefore, the first optical signal passes from the first port coupling region to the second port coupling region, and the second optical signal passes from the second port coupling region to the third port coupling region.

According to yet another aspect of the present invention, an optical circulator device for coupling three or more optical fiber ports is provided, which typically comprises first and second refraction elements each having a refraction axis perpendicular to a propagation axis, wherein each refraction element is arranged so that light traveling in a forward direction parallel to the propagation axis and having a first linear polarization orientation is refracted by a first angle relative to the refraction axis along a refraction plane defined by the propagation and refraction axes, and light traveling in a forward direction parallel to the propagation axis and having a second linear polarization orientation perpendicular to the first polarization orientation passes through unrefracted, wherein the first and second refraction elements are arranged opposite each other relative to the propagation axis, with anti-parallel refraction axes and with parallel refraction planes so that light refracted by one refraction element is refracted back parallel to the propagation axis by the other refraction element. The device also typically comprises first and second polarization orientation elements coupled to opposite ends of the first and second refraction elements, respectively, and first and second polarization beam splitting (PBS) films deposited on said first and second polarization orientation elements, respectively, wherein the end face of each of the first and second PBS films opposite the polarization orientation elements defines one or more port coupling regions each for coupling light signals from an optical fiber port, wherein the first and second PBS films are dimensioned and arranged so as to split a light signal in a forward direction into two parallel beams of light linearly polarized perpendicular to each other, and to combine parallel beams of light linearly polarized perpendicularly to each other in the reverse direction into a single beam of light. The first polarization orientation element is typically arranged with respect to the first refraction element and the first PBS film so as to orient the polarization of both of the parallel light beams of a first optical signal propagating along a forward direction from a first port coupling region on the first PBS film parallel to the first linear polarization orientation so that both beams are refracted by the first angle by the first refraction element, and to orient the polarization of two beams linearly polarized parallel to each other propagating in the reverse direction so that they are polarized perpendicular to each other. The second polarization orientation element is typically arranged with respect to the second refraction element and the second PBS film so as to orient the polarization of both of the parallel light beams of a second optical signal propagating along a forward direction from a second port coupling region on the second PBS film parallel to the second linear polarization orientation so that both beams pass through the second refraction element unrefracted, and to orient the polarization of two beams linearly polarized parallel to each other propagating in the reverse direction so that they are mutually perpendicular. In operation, therefore, the first optical signal passes from the first port coupling region to the second port coupling region, and the second optical signal passes from the second port coupling region to the third port coupling region.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

FIG. 1A is an isometric view diagram showing the structure of a three-port circulator device including a Wollaston Prism element according to an embodiment of the present invention; FIG. 1B is a top view showing the structure and operation of the three-port circulator device of FIG. 1A; FIG. 1C is a side view showing the structure and operation of the three-port circulator device of FIG. 1A; FIG. 1D is a state diagram showing the polarization and position of beam(s) at different locations between two sets of consecutive ports of the three-port circulator device of FIG. 1A;

FIGS. 4A–4D illustrate by way of an isometric view, a top view, a side view, and a polarization state diagram, respectively, the structure and operation of another three-port circulator device according to an embodiment of the present invention;

FIGS. 7A–7D illustrate by way of an isometric view, a top view, a side view, and a polarization state diagram, respectively, the structure and operation of a six-port circulator device according to an embodiment of the present invention;

FIGS. 8A–8E illustrate by way of an isometric view, two cross-sectional top views, a side view, and a polarization state diagram, respectively, the structure and operation of another six-port circulator device according to an embodiment of the present invention;

FIGS. 13A–13F illustrate a magnetic processing methodology for obtaining the desired magnetic profile in a magnetic garnet according to an embodiment of the present invention;

FIG. 15 illustrates a half-wave plate created from bi-directionally obliquely deposited thin films according to an embodiment of the present invention;

DESCRIPTION OF THE SPECIFIC EMBODIMENTS

Circulator Devices

Figure 2:
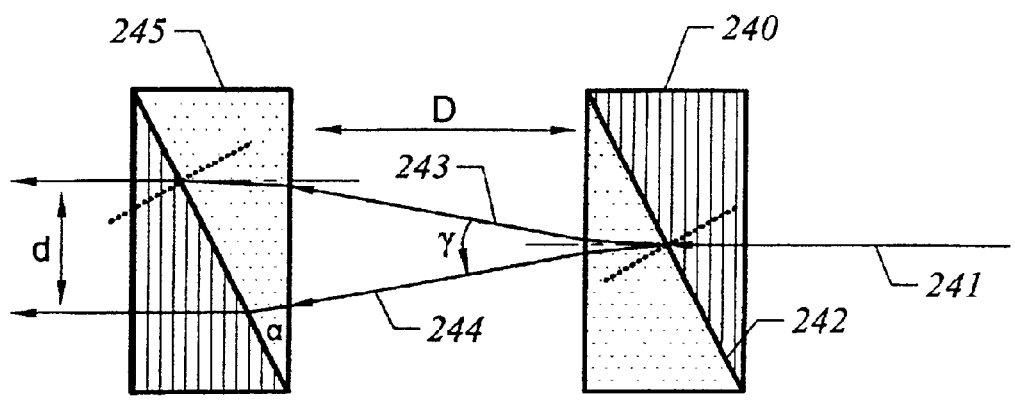
FIG. 2 illustrates the operation of a Wollaston Prism element.

FIGS. 1A–1D show the elements and operation of a three-port circulator device 100 including Wollaston prism elements according to an embodiment of the present invention. As shown in FIG. 1A, the three-port circulator device 100 includes polarization beam splitter (PBS) elements 110 and 170, Faraday rotator elements 120 and 160 and half-wave plates 130 and 150 arranged on either side of complementary Wollaston Prism elements 140 and 145. Light signals pass to and from the circulator device through GRIN (GRaded INdex) lenses 190 and 195 attached to the optical port coupling regions (not shown) on the end faces of the PBS elements 110 and 170 respectively. Each GRIN lens 190 and 195 is sized to accommodate one or more input signals received from attached ends of optical fibers (shown in FIG. 1A as fiber ports 1, 2 and 3). As explained below, light from port 1 passes to port 2, and light from port 2 passes to port 3. Light from port 3 is dispersed, or absorbed.

In general, and as utilized in embodiments of the present invention, a GRIN lens collimates light from the attached fibers (which appear as point sources) toward the port coupling regions of the circulator device. Similarly, a GRIN lens refocuses collimated light from the direction of the circulator device toward the optical fibers into points. As an example, with reference to FIG. 1, a light signal received from an input optical fiber at port 1 is collimated by the GRIN lens 190 toward the PBS element 110. When the light signal emerges from the PBS element 170, it is refocused by the GRIN lens 195 toward an output optical fiber at port 2. Similarly, a light signal received from an input optical fiber at port 2 is collimated by the GRIN lens 195 toward the PBS element 170, and is refocused by the GRIN lens 190 toward an output optical fiber at port 3. In preferred aspects, GRIN lenses according to the present invention, including the GRIN lenses 190 and 195, may comprise a miniature GRIN lens, or an array of two or more miniature GRIN lenses each with a diameter on the order of 1 mm or smaller. Alternatively, thermal expanded core (TEC) fiber collimators may be used to couple fiber ends to the circulator device. Reference is made to U.S. Pat. No. 5,594,825 and an article by K. Shiraishi, Y. Aizawa and S. Kawakami, "Beam expanding fiber using thermal diffusion of the dopant," *Journal of Lightwave Technology*, Vol. 18, No. 8, August 1990, pp. 1151–1161, which are each hereby incorporated by reference in its entirety for all purposes.

Each of the PBS elements 110 and 170 divides a light beam having an arbitrary state of polarization received from each coupled port in the forward direction into two linearly polarized components with mutually perpendicular polarization states, and combines two mutually perpendicular polarized components in the reverse direction. In general, these components are typically referred to as the e-(extraordinary) and o-(ordinary) beams. Each PBS 110 and 170 has a principal plane in which the optic axis lies and in which the divided e- and o-beams travel. In general, the o-beam is defined as being polarized perpendicular to the principal plane and so the beam is unrefracted and maintains its propagation direction, while the e-beam is defined as being polarized parallel to the principal plane and is refracted by an angle, δ.

According to the present embodiment as shown in FIGS. 1A–1D, for example, the PBS elements 110 and 170 are each arranged so that their principal planes are parallel to the y-z plane (plane of FIG. 1C) where the direction of propagation of an incoming light signal is along the z-axis. Hence the optic axis of each of PBS elements 110 and 170 lies in the y-z plane at an angle θ relative to the z-axis, and at 90° relative to the x-axis. For any light traveling parallel to the optic axis, there is no birefringence. Thus, each of the PBS elements are arranged such that the e-beam is refracted along the principal plane (vertically relative to FIGS. 1A and 1C), while the o-beam passes straight through along the z-direction. Unless stated otherwise it is to be assumed throughout this detailed description of specific embodiments that the direction of propagation of incoming light signals is be parallel to the z-axis.

Each of the Faraday rotator elements 120 and 160 rotates the state of polarization of a beam by a certain angle in a certain direction (e.g., clockwise) regardless of the direction of propagation of the beam (i.e., Faraday rotator elements are non-reciprocal). In preferred embodiments of the present invention, the Faraday rotator elements, including the Faraday rotator elements 120 and 160, include a magnetically saturated latched garnet film as described in more detail below. In these embodiments, the thickness and saturation magnetization are selected to obtain the desired rotation (e.g., 45°) of the plane of polarization of one or more pre-selected wavelengths. U.S. Pat. No. 5,801,875, which is hereby incorporated by reference in its entirety for all purposes, discusses various attributes and properties of latching garnet structures.

According to the present embodiment as shown in FIGS. 1A–1D, the Faraday rotator elements 120 and 160 each includes oppositely poled regions (i.e., the magnetic domains of the magnetic garnet are periodically reversed as described in more detail below). Additionally, the Faraday rotator elements 120 and 160 are dimensioned so as to rotate the polarization of a beam by 45°. Thus, the oppositely poled regions of the first Faraday rotator encountered by the component beams of each light signal rotate the two mutually perpendicular states of polarization into the same polarization state. Similarly, the oppositely poled regions of the second Faraday rotator encountered by the component beams rotate the two parallel states of polarization into mutually perpendicular states of polarization. That is, the divided components of each light signal are rotated by 45° in opposite directions by the periodically poled Faraday rotators 120 and 160.

Each of the half-wave plates 130 and 150 are oriented so as to rotate the state of polarization of a linearly polarized beam by 45°, clockwise or counterclockwise, depending on the direction of propagation (i.e., half-wave plates are reciprocal). As shown in FIG. 1D, for example, the half-wave plate 130 is arranged such that the states of polarization of the complementary beams are rotated counterclockwise when the (divided) light signal is propagating from an odd-numbered port to an even-numbered port (left to right in FIGS. 1B and 1C), and clockwise when the light signal is propagating in the reverse direction. Similarly, half-wave plate 150 is arranged such that the states of polarization are rotated clockwise when the light signal is propagating from an odd-numbered port to an even-numbered port, and counterclockwise when the light signal is propagating in the reverse direction. Thus, the combination of each adjacent pair of Faraday rotators and half-wave plate elements operates to convert mutually perpendicular polarization components into components having parallel states of polarization in a desired orientation. Similarly, each adjacent pair of Faraday rotator and half-wave plate elements converts components having parallel polarization states into mutually perpendicular polarization states.

According to the present embodiment as shown in FIGS. 1A–1D, the PBS elements 110 and 170 are each arranged so that their principal planes are parallel to the y-z plane (the plane of FIG. 1C), where the direction of propagation of an incoming light signal is along the z-axis. Thus, each of the PBS elements are arranged such that the e-beam is refracted along the principal plane with a y-component (vertically relative to FIG. 1C), while the o-beam passes straight through along the z-direction. Thus, in the present embodiment, ports 1 and 3 are vertically displaced relative to port 2 as shown in FIG. 1C. Additionally, the Faraday rotator elements 120 and 160 are each dimensioned so as to cause a 45° rotation. Further, each Faraday rotator element is designed and arranged with only two oppositely poled regions. As shown in FIGS. 1A and 1C, the oppositely poled regions are horizontally divided (i.e., a horizontal boundary between the two regions) so that the split beam components interact with oppositely poled regions.

FIG. 2 illustrates the general operation of a Wollaston Prism element, such as the Wollaston Prism elements 140 and 145 of FIGS. 1A–1C. A Wollaston Prism element includes two orthogonal prisms which are coupled together so that their optical axes lie perpendicular to each other and perpendicular to the direction of propagation of an incident light beam. Light striking the surface of incidence at right angles is refracted in the first prism into an ordinary (o) beam and an extraordinary (e) beam. However, these two beams continue to propagate in the same direction without refraction. Since the optical axis of the second prism is perpendicular to that of the first, the o-beam becomes an e-beam at the boundary surface, and its refractive index changes from n(o) to n(e). As n(e)<n(o), the e-beam is refracted away from the axis of incidence. The e-beam, on the other hand, becomes an o-beam at the boundary surface and is refracted toward the axis of incidence. Thus, with reference to FIG. 2, an incident light beam 241 entering the Wollaston Prism element 240 from the right is first split into two mutually orthogonal components by the first encountered prism, with both components traveling along the same path. At the boundary 242 between the first and second prisms, the o-beam becomes an e-beam and is refracted away from the normal to the boundary surface 242 (upwards in FIG. 2), whereas the e-beam becomes an o-beam and is refracted toward the normal (downwards in FIG. 2). Upon reaching the Wollaston Prism element 245, both split beams are refracted as shown such that they emerge as parallel beams propagating parallel to the original direction of propagation of incident light beam 241. It should be appreciated that incident light beams traveling in the opposite direction will interact with the Wollaston Prism elements 240 and 245 in a similar manner.

If the incident beam 241 is already polarized parallel or perpendicular to the optic axis of the first encountered prism of the Wollaston Prism element 240, the beam will not be split at the boundary 242. Rather, if the incident beam 241 is polarized perpendicular to the optic axis of the first prism (i.e., o-beam), the beam will be refracted upwards at the boundary 242 and emerge as beam 243. Similarly, if the incident beam 241 is polarized parallel to the optic axis of the first prism (i.e., e-beam), the beam will be refracted downwards at the boundary 242 and emerge as beam 244.

In general, the center-to-center spacing between optical port assemblies on the same end face of circulator devices including the Wollaston Prism elements are determined by the geometry and spacing of the two Wollaston Prism elements as shown in FIG. 2. Specifically, the spacing, d, between output beams 243 and 244 is fairly accurately determined by the formula:

$$d = 2D * \tan\{\arcsin[\Delta n * \tan(\alpha)]\},$$

where D is the spacing between the Wollaston Prism elements, $\Delta n$ is the difference between n(o) and n(e), and $\alpha$ is the angle of incidence of the light beam relative to the normal to the boundary (e.g., boundary 242) between prism portions of each Wollaston Prism element. As an example, for $\alpha$ approximately 30°, $\Delta n$ approximately 0.2, and D approximately 2 mm, d is approximately 0.2 mm. Thus, embodiments including Wollaston Prism elements provide for easy alignment of fiber inputs by longitudinally adjusting the relative position, D, between the two Wollaston Prism elements.

In FIGS. 1A–1C, the Wollaston Prism elements 140 and 145 are arranged so as to refract beams along the x-z plane as shown, for example, in the cross-sectional top view (parallel to the x-z plane) of FIG. 1B. Further, the Faraday rotator element 120 and half-wave plate 130 are arranged such that both components of a light signal entering the Wollaston Prism element 140 from either port 1 or port 3 are perpendicular (e.g., o-beams) to the optic axis of the first encountered prism. Similarly, the Faraday rotator element 160 and half-wave plate 150 are arranged such that both components of a light signal entering the Wollaston Prism element 145 from port 2 are parallel (e.g., e-beams) to the optic axis of the first encountered prism. As shown in FIG. 1B, for example, a light signal propagating in the forward direction from port 1 is refracted by the Wollaston Prism element 140 by an angle relative to the propagation axis (horizontal line in FIG. 1B) and having a component along its refraction axis (represented by the downward pointing vertical arrow), and a light signal propagating in the forward direction from port 2 is refracted by the Wollaston Prism element 145 by an angle relative to the propagation axis and having a component along, but opposite the direction of, its refraction axis (represented by the upward pointing vertical arrow). Thus, as shown in FIGS. 1A–1C, for example, the two Wollaston Prism elements 140 and 145 are complementary in that they are oriented opposite each other along the propagation axis as shown such that the respective refraction axes are anti parallel and such that forward propagation light signals are refracted in a plane defined by the propagation and refraction axes.

The general operation of circulator 100 of FIGS. 1A–1C is therefore as follows. A light signal received from an optical fiber at port 1 is collimated by the GRIN lens 190 toward the PBS element 110 where it is split into two linearly polarized beams, with the e-beam (y-polarized) being refracted (downwards in FIG. 1C) and the o-beam (x-polarized) maintaining its propagation direction (+z direction). The beams reach oppositely poled regions of the Faraday rotator element 120 and are rotated by 45° in opposite directions so that the beams are linearly polarized parallel to each other. Each of the beams is then rotated another 45° in the same direction (counterclockwise in FIG. 1D) by the half-wave plate 130 so that each beam is polarized as an o-beam (y-polarized) relative to the first encountered prism of the Wollaston Prism element 140. Thus, at the prism boundary of Wollaston Prism element 140, both beam components become e-beams relative to the second encountered prism of the Wollaston Prism element 140 and are refracted away from the normal to the boundary (downward in FIG. 1B). The two parallel beam components, polarized parallel to each other, reach the Wollaston Prism element 145 and are refracted back along the z-direction. Both components, still polarized parallel to each other, reach the half-wave plate 150 and are rotated 45° in the same direction (clockwise in FIG. 1D). Each of the beams, still linearly polarized parallel to each other, reach oppositely poled regions of the Faraday rotator element 160 and are rotated 45° in opposite directions so that the beams are linearly polarized perpendicular to each other. The beams enter the PBS 170 and are combined back into one beam of light; the original o-beam is now an e-beam to PBS 170 and is refracted (downwards in FIG. 1C), while the original e-beam is now an o-beam and maintains its propagation direction. The collimated beam emerges from the PBS element 170 and is focused by the GRIN lens 195 toward an optical fiber at port 2. In this manner a light signal from port 1 passes to port 2.

For a light signal originating from port 2, the light signal is collimated by the GRIN lens 195 toward the PBS element 170 where it is split into two linearly polarized beams, with the e-beam being refracted (upwards in FIG. 1C) and the o-beam maintaining its propagation direction (−z direction). The beams reach oppositely poled regions of the Faraday rotator element 160 and are rotated by 45° in opposite directions so that the beams are linearly polarized parallel to each other. Each of the beams is then rotated another 45° in the same direction (counterclockwise in FIG. 1D) by the half-wave plate 150 due to the orientation of the plate's optical axis with respect to the beams' polarization states so that each beam is polarized as an e-beam (x-polarized)

relative to the first encountered prism of the Wollaston Prism element 145. Thus, at the prism boundary of Wollaston Prism element 145, both beam components become o-beams relative to the second encountered prism of the Wollaston Prism element 145 and are refracted towards the normal to the boundary (downwards in FIG. 1B). The two parallel beam components, polarized parallel to each other, reach second prism element 140 and are refracted back parallel to the z-direction. The two parallel beams, polarized parallel to each other, reach the half-wave plate 130 and are rotated 45° in the same direction (clockwise in FIG. 1D) due to the orientation of the plate's optical axis (22.5° with respect to the y-axis) with respect to polarization of the beams. Each of the beams, still linearly polarized parallel to each other, reaches oppositely poled regions of the Faraday rotator element 120 and is rotated 45° in opposite directions so that the beams are linearly polarized perpendicular to each other. The beams enter the PBS 110 and are combined back into one beam of light; the original o-beam is now an e-beam to the PBS 110 and is refracted (upwards in FIG. 1D) while the original e-beam is now an o-beam and maintains its propagation direction. The collimated beam is focused by the GRIN lens 190 toward an optical fiber at port 3. In this manner, a light signal from port 2 passes to port 3.

A light signal originating from port 3 propagates similar to a light signal originating from port 1. However, upon interacting with the Wollaston Prism element 140, the light signal is refracted (downward in FIG. 1B) and is absorbed and/or dissipated.

It should be appreciated that circulator devices according to the present invention have low polarization mode dispersion (PMD). PMD is typically measured in terms of a time delay between two light beam polarization components traveling between two points along different paths. Potential sources of PMD include the birefringent PBS elements in the circulator. Each forward propagating beam is split into its mutually perpendicular o- and e-beam components, with the e-beam component being refracted and therefore traveling a slightly longer distance. However, the time delay created at the PBS coupled to an input port is compensated for at the PBS coupled to the output port. The e-beam at the input PBS becomes an o-beam at the output PBS, while the o-beam at the input PBS becomes an e-beam at the output PBS. Thus, with the same length and material of the two PBS elements, PMD is avoided. PMD is also avoided in the Wollaston Prism elements as the elements of the circulator are arranged such that no time delay between the components beams is introduced by the Wollaston Prism elements; both components are simultaneously refracted by the Wollaston Prism elements, thereby following substantially the same path length.

Figure 3A:
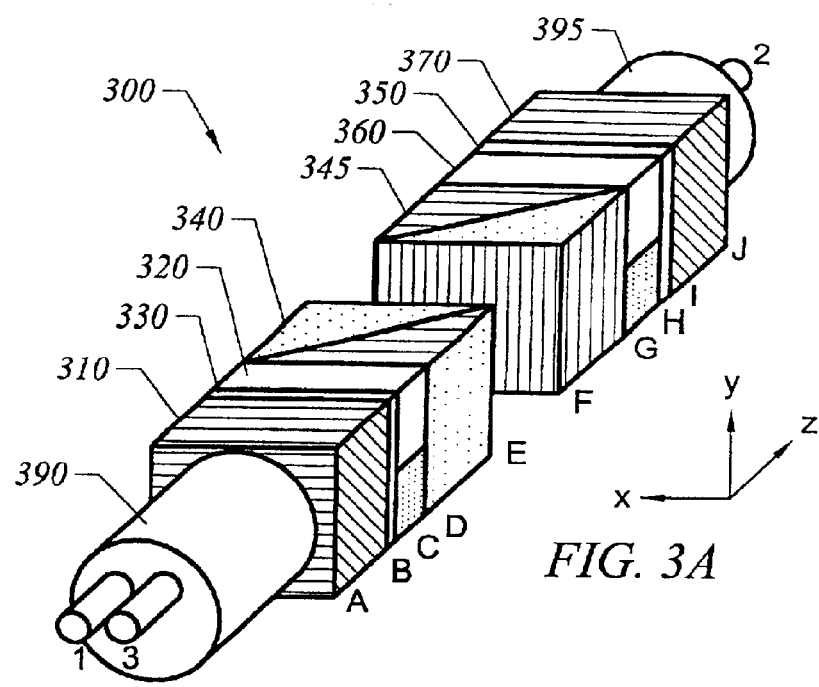
FIGS. 3A–3D illustrate by way of an isometric view, a top view, a side view, and a polarization state diagram, respectively, the structure and operation of another three-port circulator device according to an embodiment of the present invention.
Figure 3B:
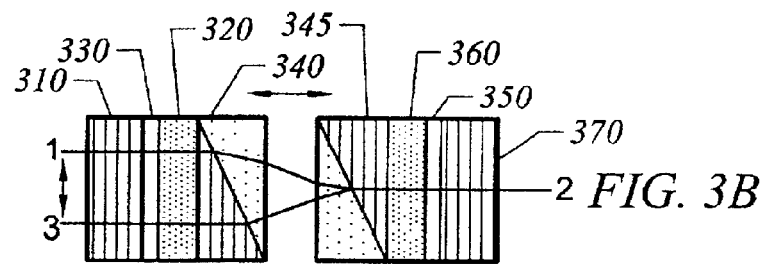
Figure 3C:
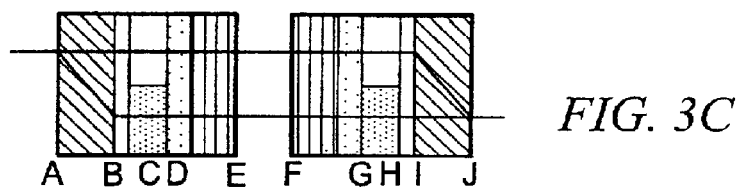
Figure 3D:
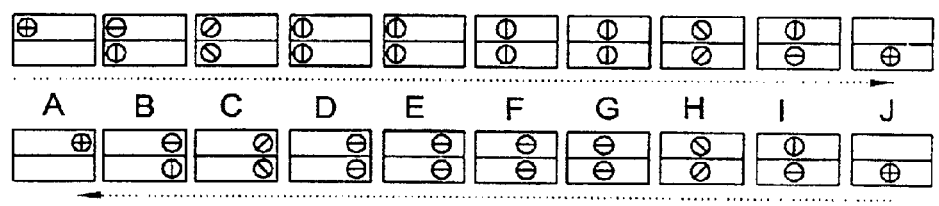
Figure 5A:
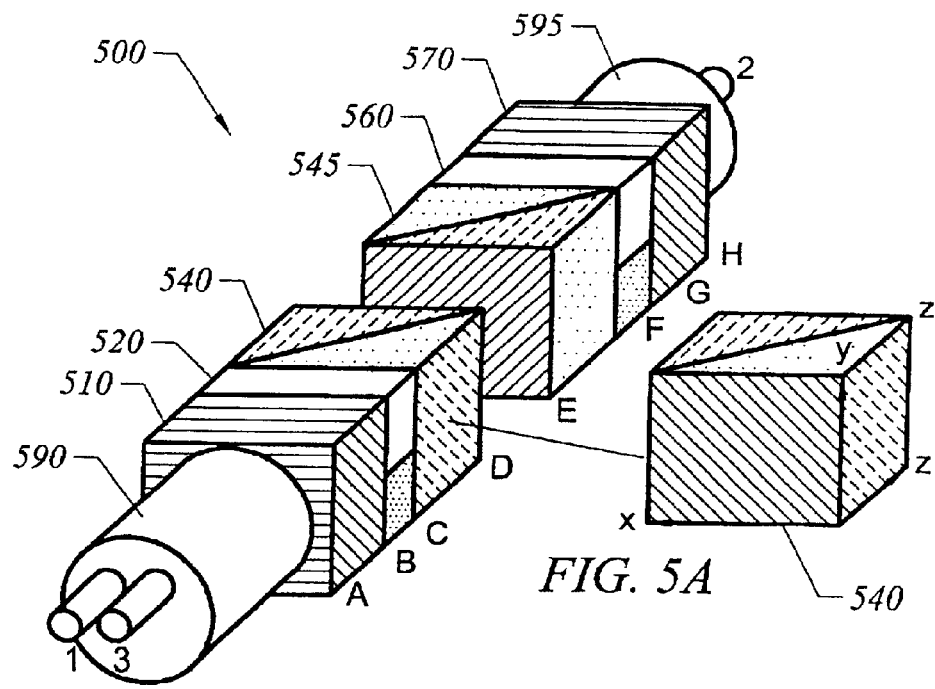
FIGS. 5A–5D illustrate by way of an isometric view, a top view, a side view, and a polarization state diagram, respectively, the structure and operation of another three-port circulator device according to an embodiment of the present invention.
Figure 5B:
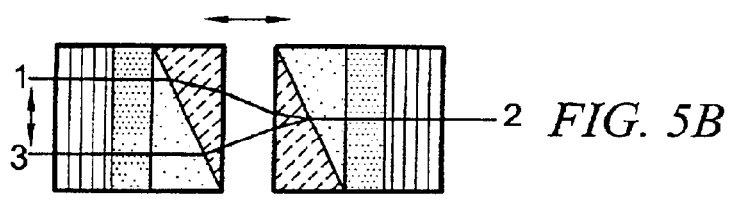
Figure 5C:
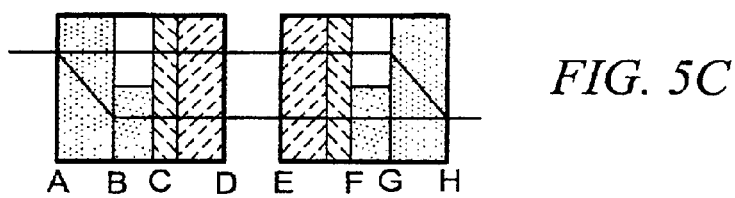
Figure 5D:
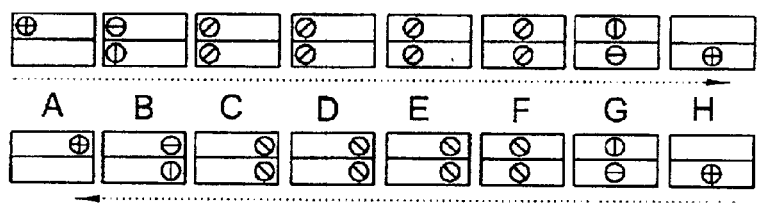
Figure 6A:
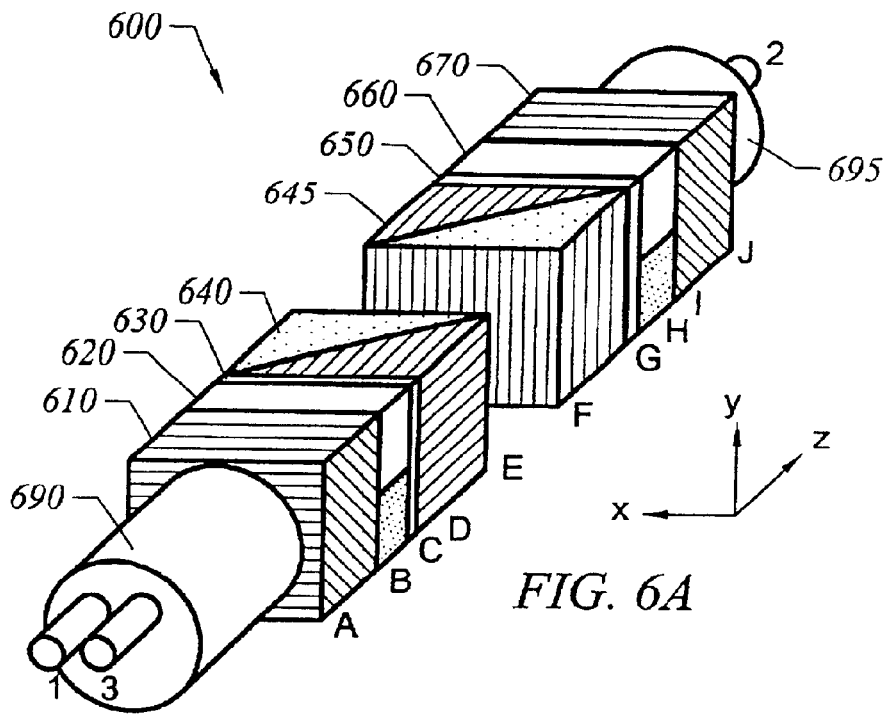
FIGS. 6A–6D illustrate by way of an isometric view, a top view, a side view, and a polarization state diagram, respectively, the structure and operation of another three-port circulator device including Rochon Prism elements according to an embodiment of the present invention.
Figure 6B:
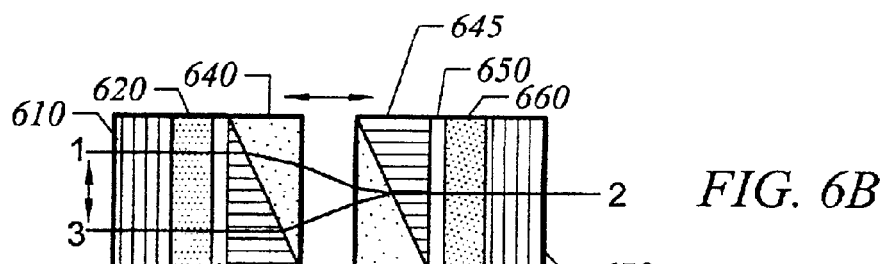
Figure 6C:
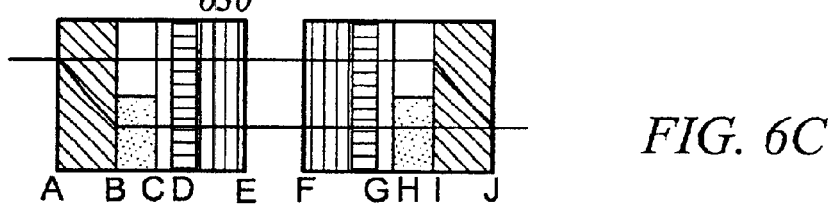
Figure 6D:
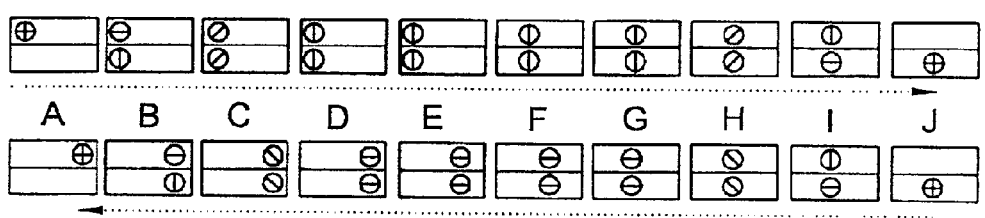

According to the present invention, the polarization beam splitters (PBSs), for example, the PBS elements 110 and 170, can be made using birefringent crystals, such as rutile, $YVO_4$, calcite, $LiNbO_3$ and others. However, it is preferred that each PBS element is made using a thin film coating technique with a tilted substrate assembly as described in more detail below. In such embodiments, the dimension of each PBS film along the z-axis is preferably between about 0.25 mm to about 0.5 mm and more preferably between about 0.25 mm to about 0.35 mm. For embodiments using PBS crystals, the dimension along the z axis is generally greater. For example, using a $YVO_4$ crystal, a dimension of approximately 1.25 mm is practical. FIGS. 3A–3D show the elements and operation of another three-port circulator device 300 according to an embodiment of the present invention. The circulator device 300 includes PBS elements 310 and 370, Faraday rotator elements 320 and 360, half-wave plates 330 and 350, GRIN lenses 390 and 395, and Wollaston Prism elements 340 and 345, and is similar to the circulator device 100. For example, the PBS elements 310 and 370 are each arranged such that their principal planes are parallel to the y-z plane (plane of the drawing of FIG. 30). In the circulator device 300, however, the relative positions of the half-wave plates and Faraday rotator elements are reversed. That is, in the circulator device 300 a forward z-propagating beam's components first encounter a half-wave plate and then a Faraday rotator element. Such a reversal of position of the half-wave plates and Faraday rotator elements only affects the local polarization states of the component beams and does not change the general operation of the circulator device. For example, as shown in FIG. 3D, a beam's mutually perpendicular polarized components originating from port 2 (bottom trace) first encounter the half-wave plate 350, which rotates both components by 45° in the counterclockwise direction (position H). The beam components, still mutually perpendicular to each other, then encounter oppositely poled regions of the Faraday rotator element 360, which rotate the components by 45° in opposite directions such that they are polarized as an e-beam (x-polarized) relative to the first encountered prism of the Wollaston Prism element 345 (position G). Thus, as with the embodiment in FIGS. 1A–1D, the combination of each adjacent pair of Faraday rotator and half-wave plate elements operates to convert mutually perpendicular polarization components into components having parallel states of polarization in a desired orientation. Similarly, each adjacent pair of Faraday rotator and half-wave plate elements convert components having parallel polarization states into mutually perpendicular polarization states.

FIGS. 4A–4D show the elements and operation of another three-port circulator device 400 according to an embodiment of the present invention. The circulator device 400 includes PBS elements 410 and 470, Faraday rotator elements 420 and 460. GRIN lenses 490 and 495, and Wollaston Prism elements 440 and 445. The Wollaston Prism elements 440 and 445 are arranged similar to the Wollaston Prism elements 140 and 145 of FIGS. 1A–1C. It is noted that the circulator device 400 does not include any half-wave plates. Rather, the PBS elements 410 and 470 are each arranged such that the optic axis points in the direction of $\theta=45°$ relative to the z-axis and $\phi=45°$ relative to the y-axis. In this embodiment, rotation by the first encountered Faraday rotator element in opposite directions by 45° is sufficient to orient the polarization of the divided beams such that they are both parallel to or perpendicular to the optic axis of the first encountered prism of the first encountered Wollaston Prism element. Similarly, when the parallel polarized beam components emerge from the second-encountered Wollaston Prism element, rotation by the second encountered Faraday rotator element in opposite directions by 45° is sufficient to orient the beams so that they are mutually perpendicular, with one component parallel to the principal plane of the output PBS element.

FIGS. 5A–5D show the elements and operation of another three-port circulator device 500 according to an embodiment of the present invention. The circulator device 500 includes PBS elements 510 and 570, Faraday rotator elements 520 and 560. GRIN lenses 590 and 595 and Wollaston Prism elements 540 and 545. The PBS elements are arranged such that the principal plane of each lies parallel to the y-z plane. It is noted that the circulator device 500 also does not include any half-wave plates. Rather, the Wollaston Prism elements 540 and 545 are each arranged such that the optic axis of the first encountered prism of the first encountered Wollaston Prism element points in the direction of 45° relative to the x-axis and 45° relative to the y-axis, i.e., the optic axis is in the x-y plane. In this embodiment, rotation by the first encountered Faraday rotator element in opposite directions by 45° is sufficient to orient the polarization of the divided beams such that they are both parallel to or perpendicular to the optic axis of the first encountered prism of the first encountered Wollaston Prism element.

FIGS. 6A–6D show the elements and operation of another three-port circulator device 600 according to an embodiment of the present invention. The circulator device 600 includes PBS elements 610 and 670, Faraday rotator elements 620 and 660, GRIN lenses 690 and 695 and half-wave plates 630 and 650. The PBS elements 610 and 670 are arranged such that the principal plane of each lies parallel to the y-z plane. The circulator device 600 operates similarly to the FIG. 1 circulator device 100. However, rather than including Wollaston Prism elements, the present embodiment includes Rochon Prism elements 640 and 645. A Rochon Prism element includes two prisms coupled together, with mutually perpendicular optic axes similar to a Wollaston Prism, but the first encountered prism of a Rochon Prism element is oriented with its optic axis parallel, rather than perpendicular, to the direction of propagation. In a Rochon Prism element, the second encountered prism, with its optic axis at right angles to the first prism, transmits the o-beam without deviation but the e-beam is deflected.

As shown in FIGS. 6A–6D, the Rochon Prism elements 640 and 645 are each arranged such that the optic axis of the second encountered prism is parallel to the y-axis. Thus, in the present embodiment, light from port 1 entering the Rochon Prism element 640 (y-polarized) appears to the second prism as an e-beam and is refracted (downwards in FIG. 6B), and light from port 2 entering the Rochon Prism element 645 (x-polarized) appears to the second prism as an o-beam and passes through toward port 3. It should be appreciated that the center-to-center spacing of ports in circulator device embodiments including Rochon Prism elements is generally smaller than in embodiments using Wollaston Prism elements.

FIGS. 7A–7D show the elements and operation of a six-port circulator device 700 according to an embodiment of the present invention. The circulator device 700 includes PBS elements 710 and 770, Faraday rotator elements 720 and 760, half-wave plates 730 and 750, GRIN lenses 790 and 795, and Wollaston Prism elements 740 and 745. The arrangement of elements and operation is nearly identical to that of the circulator device 100, with a "stacked" arrangement of two circulator devices similar to the circulator device 100. In the present embodiment, the Faraday rotator elements 720 and 760 each have four oppositely poled regions as shown, with horizontal boundaries (relative to FIG. 7C) between the oppositely poled regions. As shown in FIG. 7C, the top two periodically poled regions of the Faraday rotator elements 720 and 760 are used by the "top" circulator represented by ports 1, 2 and 3, whereas the bottom two periodically poled regions are used by the "bottom" circulator represented by ports 1', 2' and 3'. It should be appreciated that multiple circulator devices similar to circulator device 100 may be stacked in a similar fashion.

FIGS. 8A–8E show the elements and operation of another six-port circulator device 800 according to an embodiment of the present invention. The circulator device 800 includes PBS elements 810 and 870, Faraday rotator elements 820 and 860, GRIN lenses 890 and 895, and Wollaston Prism elements 840 and 845. The arrangement of elements and operation is nearly identical to that of the circulator device 500, with a "stacked" arrangement of two circulator devices similar to the circulator device 500. The two "stacked" circulators are arranged such that the two-port end face of one circulator is located proximal the one-port end face of the other circulator. For example, as shown in FIG. 8A, ports 1 and 3 of the "top" circulator are located proximal port 2' of the "bottom" circulator.

In the present embodiment, the Faraday rotator elements 820 and 860 each have three oppositely poled regions as shown, with horizontal boundaries (relative to FIG. 8D) between the oppositely poled regions. The middle portion of each Faraday rotator element is shared by both the "top" and "bottom" circulators. The PBS elements 810 and 870 are arranged such that the principal plane of each lies parallel to the y-z plane. It is noted that the circulator device 800 also does not include any half-wave plates. Rather, the Wollaston Prism elements 840 and 845 are each arranged such that the optic axis of the first encountered prism of the first encountered Wollaston Prism element points in the direction of 45° relative to the x-axis and 45° relative to the y-axis, i.e., in the x-y plane. In this embodiment, rotation by the first encountered Faraday rotator element in opposite directions by 45° is sufficient to orient the polarization of the divided beams such that they are both parallel to or perpendicular to the optic axis of the first encountered prism of the first encountered Wollaston Prism element.

Figure 9A:
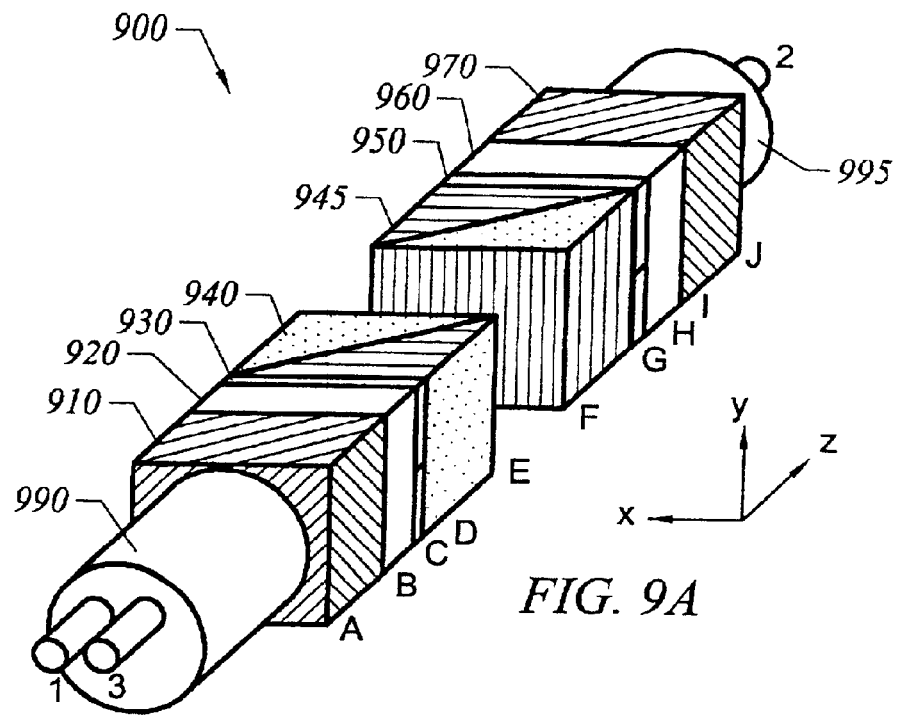
FIGS. 9A–9D illustrate by way of an isometric view, a top view, a side view, and a polarization state diagram, respectively, the structure and operation of another three-port circulator device according to an embodiment of the present invention.
Figure 9B:
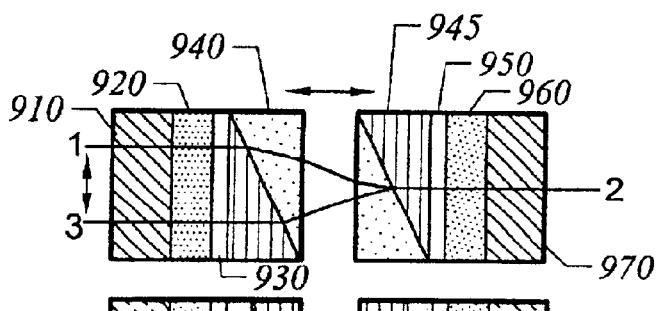
Figure 9C:
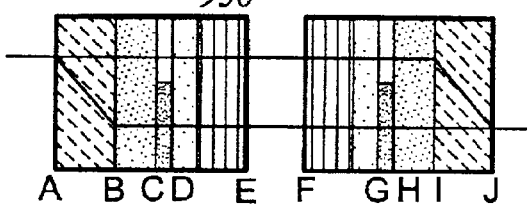
Figure 9D:
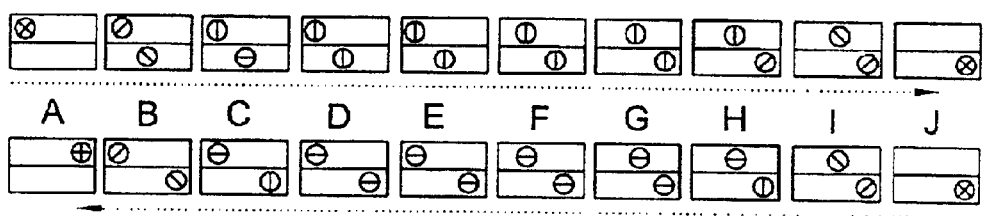

FIGS. 9A–9D show the elements and operation of another three-port circulator device 900 according to an embodiment of the present invention. The circulator device 900 includes PBS elements 910 and 970, Faraday rotator elements 920 and 960, half-wave plates 930 and 950, GRIN lenses 990 and 995, and Wollaston Prism elements 940 and 945. The PBS elements 910 and 970 are each arranged such that its optic axis points in the direction of $\theta=45°$ relative to the z-axis and $\phi=45°$ relative to the y-axis. The Faraday rotator elements 920 and 960 each have a uniform profile (i.e., uniform poling), whereas the half-wave plates 930 and 950 are each etched with a horizontal boundary as shown in FIG. 9C, i.e., a portion of each of half-wave plates 930 and 950 has been removed, while the optic axis of each of the remaining portions is arranged so as to cause a 90° rotation. In this embodiment, each Faraday rotator element rotates the component beams in the same direction, and the beam component interacting with the unetched (shaded) portion of a half-wave plate undergoes a 90° rotation, whereas the beam component interacting with the etched (unshaded) portion passes through with its state of polarization unchanged.

Figure 10A:
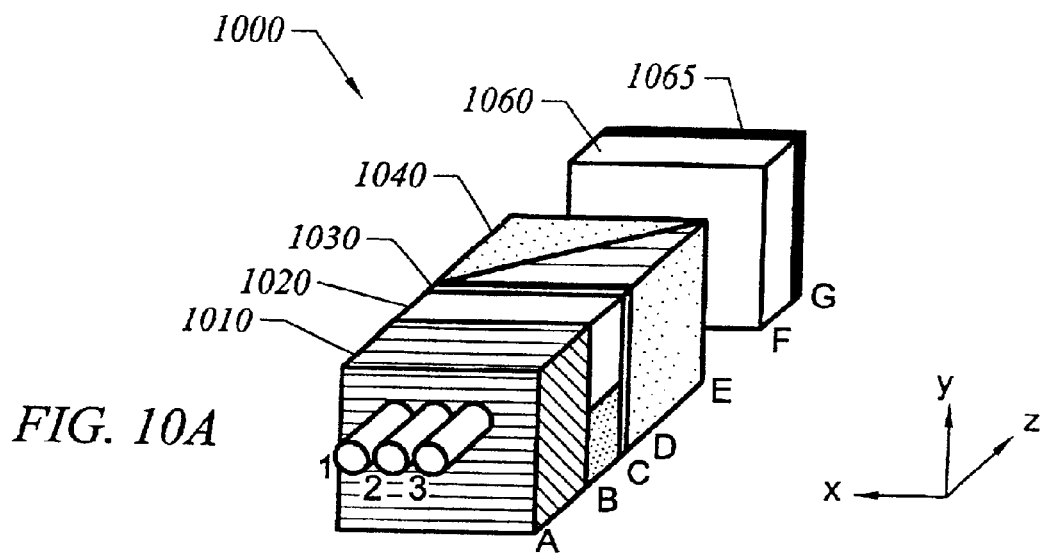
FIGS. 10A–10D illustrate by way of an isometric view, a top view, a side view, and a polarization state diagram, respectively, the structure and operation of a reflective-type three-port circulator device according to an embodiment of the present invention.
Figure 10B:
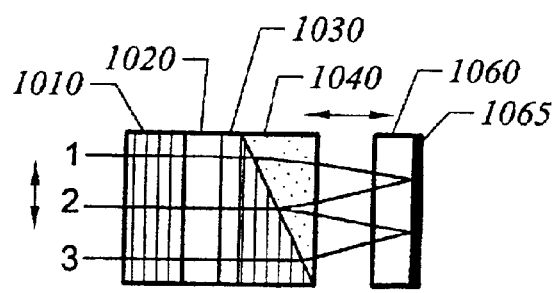
Figure 10C:
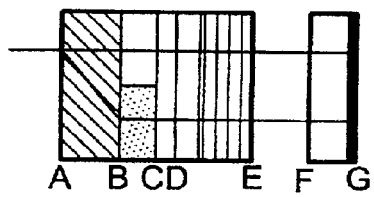

FIGS. 10A–10D show the elements and operation of a three-port reflective-type circulator device 1000 according to an embodiment of the present invention. It should be noted that collimating elements for the optical ports of the circulator device are not shown in these drawings. The circulator device 1000 includes a PBS element 1010, Faraday rotator element 1020, half-wave plate 1030, Wollaston Prism element 1040, Faraday rotator element 1060 and reflection element 1065. The PBS element 1010 is arranged with its principal plane parallel to the y-z plane (plane of the drawing of FIG. 10C). The Faraday rotator element 1020 is partially poled with a horizontal boundary between the oppositely poled regions as shown in FIG. 10C, and the Faraday rotator element 1060 is uniformly poled. In this embodiment, therefore, each Faraday rotator element rotates the component beams in opposite directions. The reflection element 1065 operates to reflect incident light beams with little to no loss, and with no change in the state of polarization. According to the present invention, a reflection element, including the reflection element 1065, preferably includes a dielectric multilayer having a high reflectivity at the desired wavelength(s). Each reflection element may, however, include a reflective metallic film, such as a silver or gold film, a noble metal film, or some other reflective metallic film. It is also noted that all ports are located on the same end face due to the reflective operation of the device.

Figure 10D:
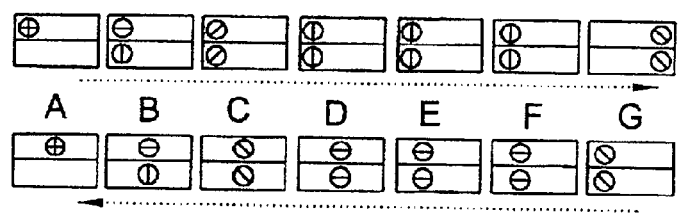
Figure 11A:
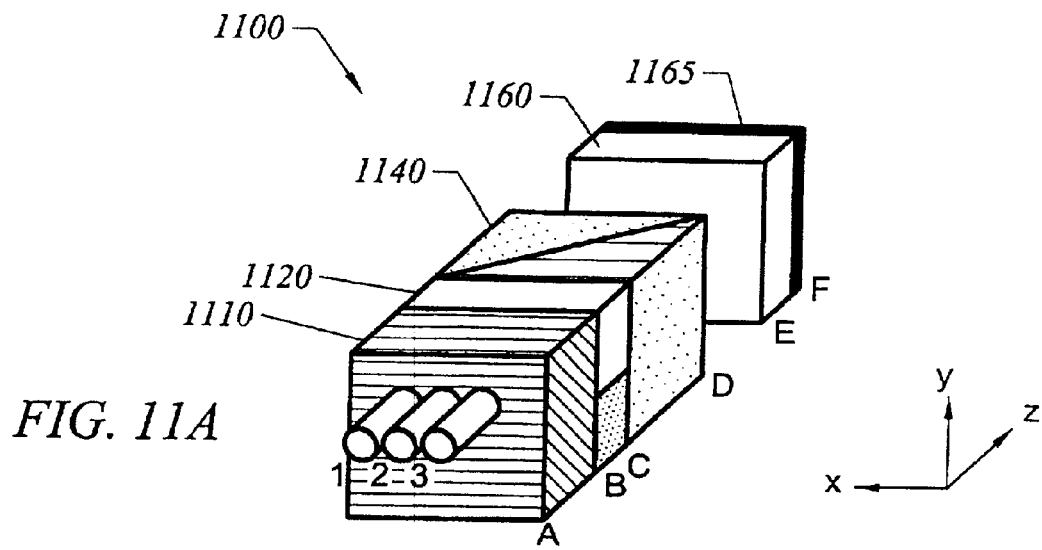
FIGS. 11A–11D illustrate by way of an isometric view, a top view, a side view, and a polarization state diagram, respectively, the structure and operation of another reflective-type three-port circulator device according to an embodiment of the present invention.
Figure 11B:
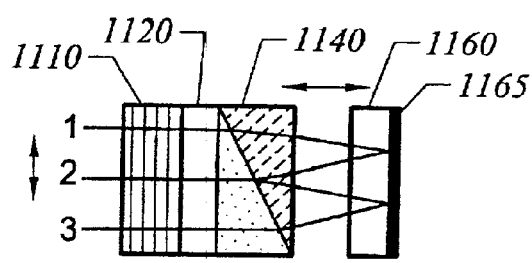
Figure 11C:
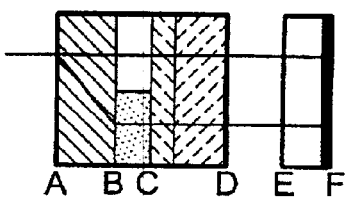
Figure 11D:
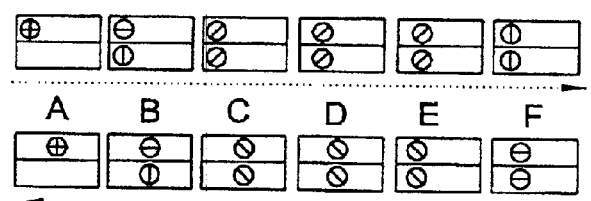

The general operation of the reflective-type circulator 1000 of FIGS. 10A–10D is therefore as follows. A (collimated) light signal received from an optical port, say, optical port 1, is split into two linearly polarized beams by the PBS element 1010, with the e-beam (y-polarized) being refracted (downwards in FIG. 10C) and the o-beam (x-polarized) maintaining its propagation direction. The divided beams reach oppositely poled regions of the Faraday rotator plate 1020 and are rotated by 45° in the opposite directions so that the components are polarized parallel to each other. The beam components are then rotated 45° by the half-wave plate 1030 so that each beam is polarized as an o-beam relative to the first encountered prism of the Wollaston Prism element 1040. Thus, at the prism boundary of the Wollaston Prism element 1040, both beam components become e-beams relative to the second encountered prism of the Wollaston Prism element 1040 and are refracted away from the normal to the boundary (downward in FIG. 10B). The two parallel beam components, polarized parallel to each other, are rotated 45° in the same direction (counterclockwise as shown in FIG. 10D) by the uniformly poled Faraday rotator element 1060.

The two parallel beams, still polarized parallel to each other, interact with the reflection element 1065 and are reflected back through the uniformly poled Faraday rotator element 1060 which rotates both beams 45° in the same direction (counterclockwise as shown in FIG. 10D). The two beams reach the Wollaston Prism element 1040 and are refracted back along the z direction. The two parallel beams, still polarized parallel to each other, reach the half-wave plate 1030, and are rotated by 45°. The beams reach the Faraday rotator element 1020 and are rotated 45° in opposite directions so that the beams are linearly polarized perpendicular to each other with one component parallel to the principal plane of the PBS element 1010. The beams are then enter the PBS element 1010 and are combined back into one beam of light; the original e-beam is still an e-beam to the PBS element 1010 and is refracted (upwards in FIG. 10C) and the original o-beam is still an o-beam and maintains its propagation direction. The combined beam enters optical port 2 and is focused by a collimating element, such as a multi-section fiber collimator or a GRIN lens (not shown in the drawings), on a coupled fiber. In this manner, a light signal from port 1 passes to port 2, and similarly from port 2 to port 3. The end port, e.g., port 3 in FIGS. 10A and 10B, is unable to pass light signals and acts much like an isolator. That is, incoming light signals received at port 3 are refracted off by the Wollaston Prism element 1040 and therefore dispersed and/or absorbed.

It should be appreciated that PMD is insubstantial in the reflective-type circulator devices of the present invention. For example, the only element which might introduce PMD in the present embodiment is the PBS element 1010; the optical paths of the divided beam components is the same in the other elements. However, considering that the e-beam (tilted) experiences a smaller index of refraction, and therefore travels faster, the overall optical paths of the o-beam and e-beam will be substantially the same.

FIGS. 11A–11D show the structure and operation of another reflective-type three-port circulator device 1100 according to an embodiment of the present invention. The circulator device 1100 includes a PBS element 1110, a periodically poled Faraday rotator element 1120, Wollaston Prism element 1140, uniformly poled Faraday rotator element 1160 and reflection element 1165. The operation of the circulator device 1100 is similar to the circulator device 1000. However, in this embodiment, no half-wave plate is included. Rather, the Wollaston Prism element 1140 is arranged such that its optic axis points in the direction 45° relative to the x-axis and 45° relative to the y-axis (i.e., the optic axis lies in the x-y plane), and the PBS element 1110 is arranged such that its principal plane lies parallel to the y-z plane. When the mutually perpendicular e- and o-beam components of a forward propagating light signal (in the +z direction) encounter the Faraday rotator element 1120, the polarization of each is oriented at a 45° angle with respect to the optical axis orientation of the Wollaston Prism element 1140. Therefore, rotation by the Faraday rotator element 1120 in opposite directions by 45° is sufficient to orient the polarization of the divided beams such that they both appear as o-beams to the first encountered prism of the Wollaston Prism element 1140. Similarly, when the parallel polarized beam components emerge from the Wollaston Prism element 1140 (i.e., in the −z direction), rotation by the Faraday rotator element 1120 in opposite directions by 45° is sufficient to orient the beams so that they are mutually perpendicular with one component parallel to the principal plane of the PBS element 1110.

Fabrication Methods

The fabrication process will now be described with reference to FIGS. 12–17. In general, the major fabrication processes for a circulator device include: formation of the magnetic garnet, magnetization/poling of the magnetic garnet, formation of half-wave plates, formation of PBS elements, formation of the Prism elements, integration of the circulator device and integration of the circulator device with a fiber array.

Figure 12:
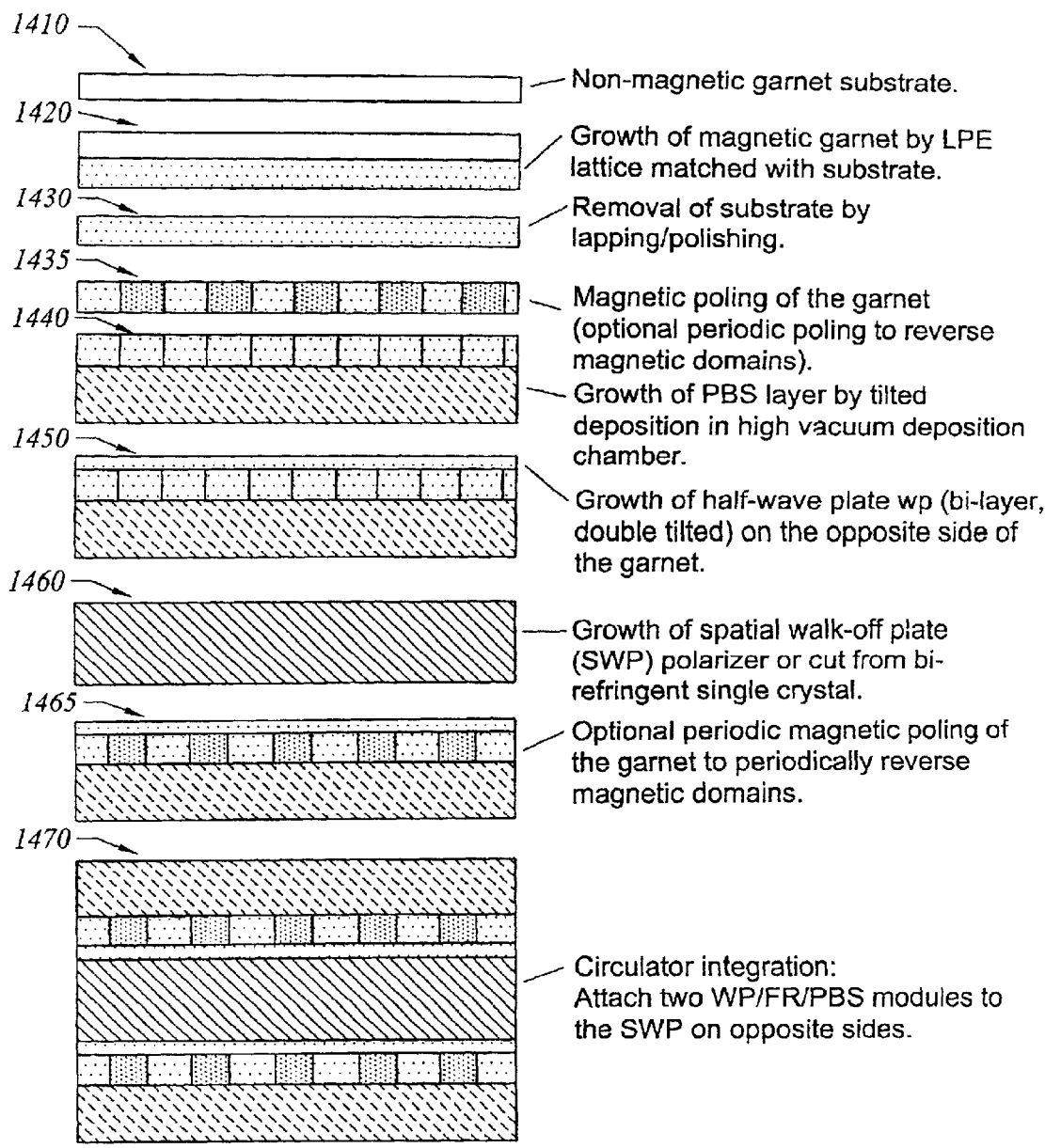
FIG. 12 illustrates a fabrication process of a core structure of a multiple port circulator device similar to the circulator device of FIG. 1 according to an embodiment of the present invention.

FIG. 12 illustrates a fabrication process of a core structure of a multiple port circulator device similar to circulator device 100 of FIG. 1 according to an embodiment of the present invention. The process starts at step 1410 by positioning a non-magnetic garnet substrate (such as NGG, a=1.2509 nm; CMZ-GGG, a=1.2497 nm; YSGG, a=1.246 nm; or mixture of YSGG and GSGG, a=1.296 nm) on a substrate holder. At step 1420, a single crystalline Bi-substituted magnetic garnet is grown on the substrate. The growth of single crystalline magnetic garnet is preferably accomplished by liquid phase epitaxy (LPE) at high temperature (~800° C.). According to one embodiment, to obtain desired magneto-optic properties (e.g., high rotation power, low temperature/wavelength dependence), the garnet film is grown in a multi-component form, such as $RE1_a RE2_b Bi_{3-a-b} Fe_{5-c-d} M1_c M2_d O_{12}$, where the elements RE1 and RE2 are added to substitute part of Bi, and are both selected from the lanthanide group, including for example: La, Pr, Nd, Sm, Eu, Gd, Tb, Dy, Ho, Yb, and Lu. M1, M2 are added to replace part of Fe, and are both selected from Ga, Al, In and Sc. The values of a, b and c, d are adjusted to match the lattice constant between the growing film and substrate. During the growth process, the substrate holder is preferably constantly rotated (back and forth) to improve film uniformity. The growth zone is in an isothermal condition with a growth temperature slightly (10–20° C.) below the saturation temperature of the melt (which is a mixture of flux materials: PbO, $B_2O_3$ and growth materials: $Fe_2O_3$, $Bi_2O_3$, $RE1_2O_3$, $RE2_2O_3$, $M1_2O_3$ and $M2_2O_3$ with a predetermined ratio).

U.S. Pat. Nos. 5,801,875 and 5,898,516 each disclose processes for forming magneto-optic materials, such as latched garnet materials, useful for forming Faraday rotator structures, and are each hereby incorporated in its entirety for all purposes.

After the growth of the magnetic garnet, the non-magnetic garnet substrate is removed by lapping/polishing at step 1430. Depending on the material used, the dimension along the z axis of a magnetic garnet is preferably in the range of between about 0.25 mm and about 1.0 mm, although garnets requiring a larger size may be used. At step 1435, the magnetic garnet is magnetically processed to obtain the desired magnetic poling profile. For example, in one embodiment, the magnetic garnet is uniformly poled. That is, the garnet is uniformly magnetized by an external field with a field strength, Br, larger than the coercivity of the garnet. In another embodiment, the magnetic garnet is thereafter periodically poled to obtain the desired periodically reversed magnetic domain structure. Additionally, the garnet is further polished to the correct thickness to provide a 45° rotation at a given wavelength. Alternatively, the garnet is first polished and then the appropriate magnetic fields are applied to the polished garnet.

FIGS. 13A–13F illustrate a magnetic processing methodology for obtaining the desired magnetic profile in the magnetic garnet according to an embodiment of the present invention. As shown at step 1510 in FIG. 13A, the as-grown magnetic garnet includes multiple domains. At step 1520 in FIG. 13B, the magnetic garnet is uniformly poled. According to one embodiment, a soft magnetic keeping layer is positioned proximate the magnetic garnet on one side and a permanent magnet having a magnetic field strength, Br, greater than the coercivity, Hcg, of the magnetic garnet is positioned on the opposite side. At step 1530 in FIG. 13C, the keeping layer and magnet are removed. At this point the magnetic garnet has a uniform magnetic profile, with all domains uniform and oriented in the same direction. For circulator device embodiments requiring a uniformly poled magnetic garnet, no further magnetic processing is required. For circulator device embodiments requiring a periodically poled magnetic garnet, a second poling process is performed. FIGS. 13D and 13F further illustrate two different poling processes: cold poling and hot poling.

For the cold poling process, at step 1540 in FIG. 13D, a soft magnetic keeping layer is positioned proximate the magnetic garnet on one side and a magnet having a magnetic field strength, Br, greater than the coercivity, Hcg, of the magnetic garnet is positioned on the opposite side. It should be appreciated that removing the keeping layer at step 1530 in FIG. 13C can be omitted when the cold poling process is used. As shown, the magnet includes a plurality of magnetic tips arranged and sized so as to create the desired poling pattern. The magnet and keeping layer are thereafter removed as illustrated in FIG. 13E and the periodically poled garnet at step 1560 may be further processed by lapping/polishing as desired.

Figure 14A:
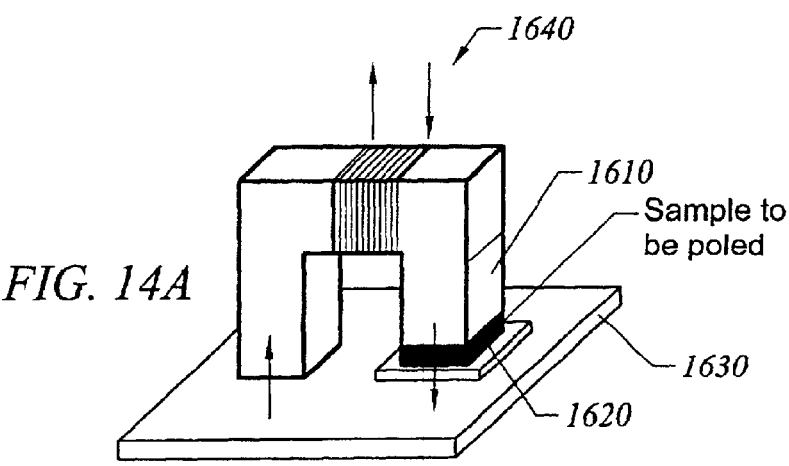
FIGS. 14A–14C illustrate a cold poling process arrangement according to an embodiment of the present invention.
Figures 14B, 14C:
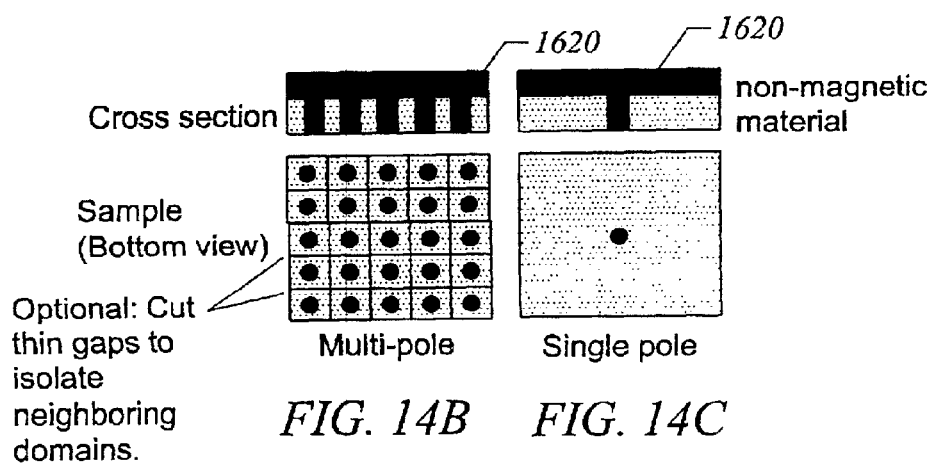

FIGS. 14A–14C illustrate a cold poling process arrangement according to an embodiment of the present invention. As shown, a U-shaped magnetic core 1610 includes a magnetic poling mold 1620 at one end. The poling mold 1620 is a micro-lithographically defined mold having one or more magnetic micro-tips. In one embodiment, each micro-tip has a width of about 100 μm to about 250 μm. The garnet is positioned between the soft keeping layer 1630 and the magnetic poling mold 1620. An electric current sufficient to create the desired magnetic field strength within the magnetic core 1610 is applied through the electrical coil 1640. As shown in the cross sectional views of the magnetic poling mold 1620 in FIGS. 14B and 14C, one (FIG. 14C) or more (FIG. 14B) magnetic tips of magnetic material are interspersed within a non-magnetic material (shaded portions) such that only the magnetic domains coming into contact with the tips have their fields reversed. Thus, with an appropriate arrangement and sizing of tips, the desired periodic poling pattern can be achieved. In one embodiment, as shown in the bottom view of the multi-pole layout in FIG. 14B, thin gaps are cut, or alternatively fused, in the magnetic garnet to delineate and isolate neighboring domains prior to the cold poling process.

For the hot poling process step 1550 as illustrated by FIG. 13F, one or more heating beams are applied to the garnet with the appropriate pattern. That is, only those regions desired to be magnetically reversed are heated. In preferred aspects, the heating beams are collimated laser beams. Heating decreases the coercivity of the magnetic garnet so that a smaller magnetic field strength is needed to reverse the heated domains. Thus, a magnet having a field strength, Br, less than the normal (unheated) coercivity of the garnet, but great enough to reverse the heated domains, is positioned proximate the garnet. In this manner, the heated domains are reversed while the unheated domains are unaffected by the magnet. In one embodiment, the beams each have a diameter of about 250 μm. It should be appreciated that the garnet may be periodically poled using the hot poling process after the circulator device has been fabricated and integrated with a fiber array. In this case, heat beams can be introduced using the attached fiber array through the other elements of the circulator device, and a magnet can be positioned proximate the circulator device as appropriate.

Figure 16:
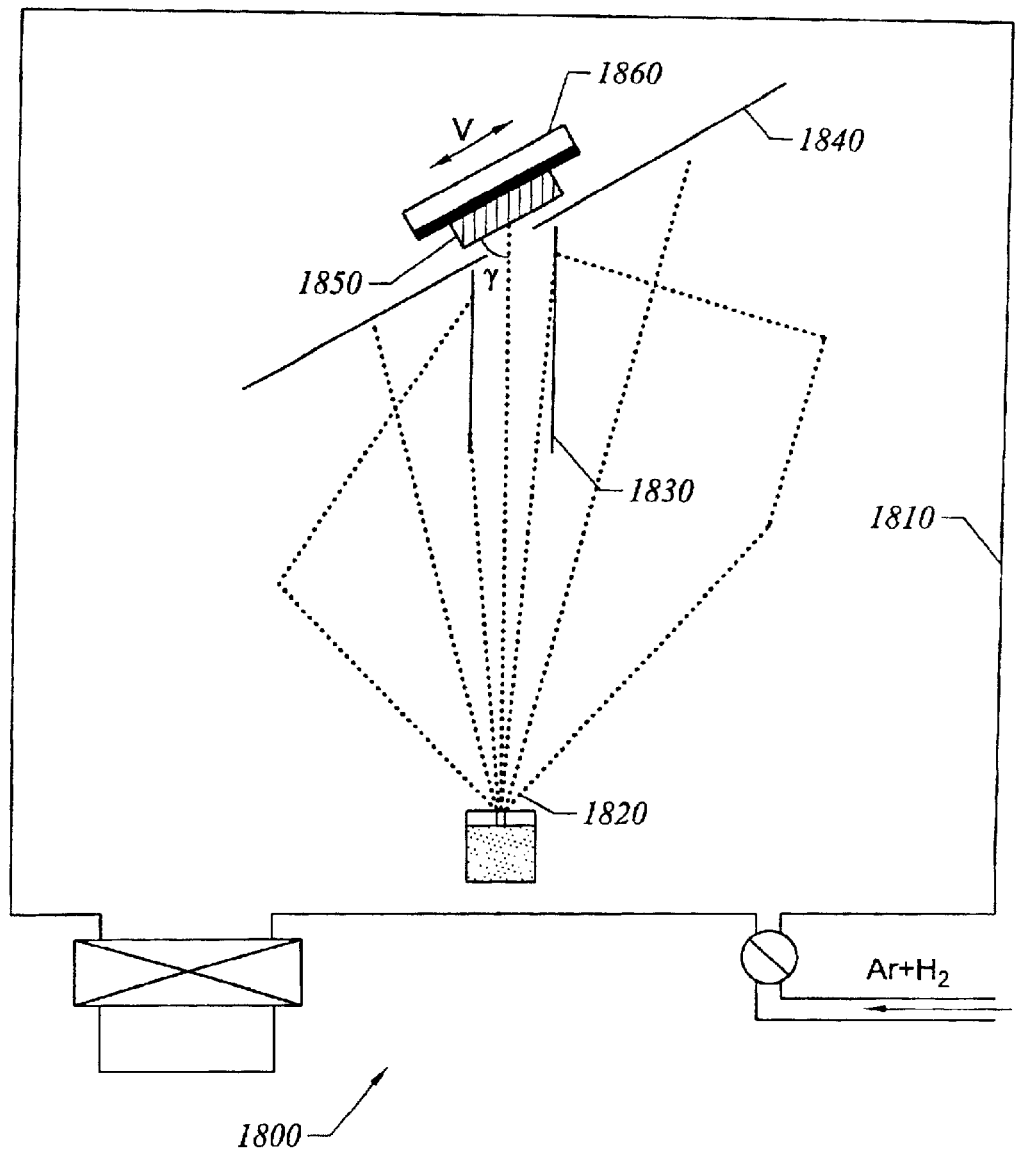
FIG. 16 illustrates a flux collimating and limiting arrangement for creating PBS layers by depositing thin films using either e-beam evaporation or ion-beams.

Returning to the fabrication process of FIG. 12, at step 1440, a PBS layer of desired thickness is grown on the magnetic garnet. In one embodiment, the PBS layer is deposited using e-beam evaporation, or an ion-beam, in a flux collimating and limiting arrangement 1800 as shown in FIG. 16. According to this embodiment, the magnetic garnet is mounted on a tilted substrate holder 1860 in a high vacuum deposition chamber 1810. Evaporant collimators 1830 direct the material from the source building material 1820 through the slot of plate 1840. Before the growth of the PBS layer, the garnet is preferably AR coated. To obtain a large birefringence, silicon (Si) is used as the source building material 1820 (rather than SiO2) with some fine (<50 nm) voids in between. To saturate the dangling bond of the amorphous Si, small amount (5–10%) of $H_2$ gas is added to Argon gas and pumped into the chamber. The deposition pressure is critical for the fineness control of the Si columnar structure. Germanium (Ge) may also be used as a source material.

To obtain large birefringence, the tilting angle of the substrate (γ) is tuned. In one embodiment, for example, the tilting angle is set at between about 65° and about 70°, and preferably about 65°, to obtain the maximum birefringence. Due to a large tilting of the substrate, non-uniformity of the growing film between the lower and upper part of the substrate becomes a problem since for a point source, the flux density is inversely proportional to the squared distance ($R^2$) between the source and the substrate. To correct the problem, in one embodiment, substrate holder 1860 is designed to move parallel to the slot of plate 1840 with a varying speed, slower (longer time to collect material) at the upper part and faster (shorter time) at the lower part. After finishing the deposition of the PBS layer 1850, the surface is preferably AR coated to enhance optical transmission and to protect against moisture incorporation into the voids (fine air gaps) in the PBS layer.

Returning again to FIG. 12, at step 1450, for embodiments including a half-wave plate, a bi-layer, double tilted half-wave plate is grown on the side of the garnet opposite the PBS layer. FIG. 15 illustrates a half-wave plate created from bi-directionally obliquely deposited thin films according to an embodiment of the present invention. Growth of a half-wave plate is accomplished using the thin film deposition technique described above with reference to FIG. 16, using a metal oxide as the source material being deposited. For example, any number of metal oxides, such as $Ta_2O_5$ and $TiO_2$, can be used. For the second layer, the substrate is rotated 180° relative to the source. U.S. Pat. No. 4,874,664, which is hereby incorporated by reference in its entirety, discloses techniques using a crucible having inclined through-holes, for producing a bi-layer, double tilted half-wave plate and other similar structures. In general, the birefringence ($\Delta n$) is created by the tilted layer structure. The bi-directional deposition improves both film and view-angle uniformity. To produce a half-wave plate, the thickness, d, of the film should satisfy the following equation:

$$\Delta n * d = \lambda/2.$$

Such a half-wave plate rotates linearly polarized light by $2\theta$, where $\theta$ is the direction of linear polarization of the incident light with respect to the optical axis before entering the half-wave plate. Thus, for example, if the half-wave plate is arranged such that $\theta$ is 22.5°, the polarization is rotated 45°. Similarly, if the half-wave plate is arranged such that $\theta$ is 45°, the polarization is rotated 90°. Such techniques are advantageous as the resulting half-wave plate is very thin, e.g., on the order of 10 $\mu$m or less. Further, such a half-wave plate produces no beam separation and can be formed on any substrate by any of a variety of metal oxides and other materials. In general, half-wave plates formed using the bi-layer deposition techniques of the present invention have an advantageous thickness of between about 5 $\mu$m and about 20 $\mu$m.

Returning again to FIG. 12, at step 1460, the Wollaston Prism elements are grown using the tilted deposition techniques as described above. That is, in one embodiment, the two prisms for a Prism element are grown using the tilted deposition techniques described herein. Alternatively, the Prism elements may be pre-fabricated and cut to the desired size as is necessary and as is well known. At step 1465, the magnetic garnet is optionally poled to reverse the magnetic domains. It should be appreciated that periodic poling of the garnet can be performed at many stages during the fabrication process. For example, the garnet may be uniformly poled at step 1430 and then immediately thereafter periodically poled at step 1435, or it may be periodically poled at step 1465 after the growth of the PBS and/or half-wave plate elements. Alternatively, the garnet may be periodically poled after the circulator device has been fabricated and attached to optical fibers (e.g., using a hot poling process) as discussed above. At step 1470, two PBS modules (each including the PBS, garnet and half-wave plate as shown) are attached to opposite sides of the two Prism elements as shown to form the circulator device. It should be appreciated that any of the elements of the circulator devices of the present invention may be AR coated as desired during the fabrication process.

Figure 17:
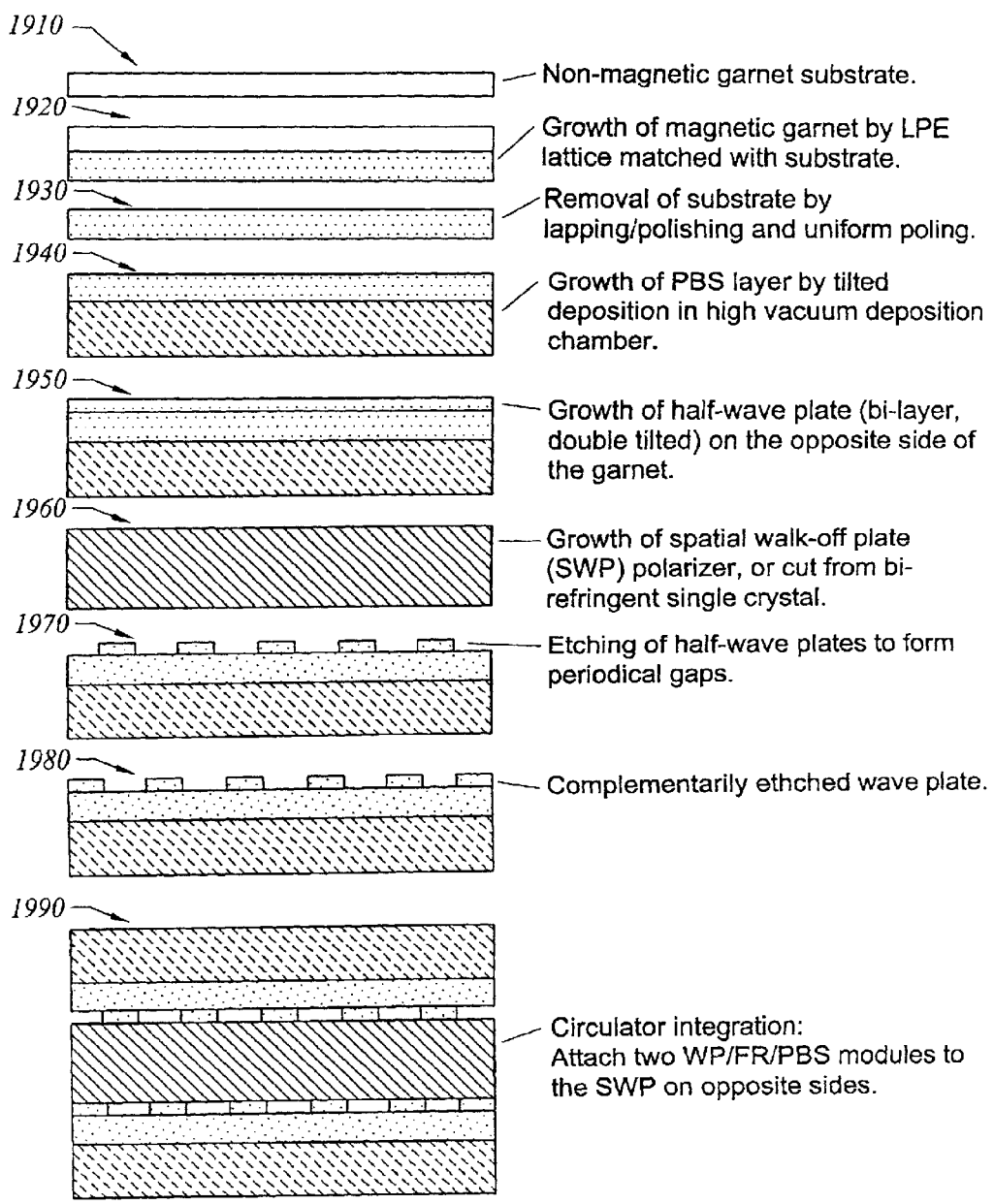
FIG. 17 illustrates another fabrication process of a core structure of a multiple port circulator device similar to the circulator device of FIG. 8 according to an embodiment of the present invention.

FIG. 17 illustrates another fabrication process, similar to the process of FIG. 12, including the formation of etched half-wave plates according to an embodiment of the present invention. The process starts at step 1910 with a non-magnetic garnet substrate. At step 1920 magnetic garnet is grown by liquid phase epitaxy with the particular garnet film with matching lattice constants of the growing film and the substrate. Then the non-magnetic garnet is removed by lapping/polishing and the magnetic garnet is poled at step 1930. In step 1940 a PBS layer is deposited on the magnetic garnet and on the opposite side of the garnet a double tilted, half-wave plate (HP) layer is grown by step 1950. A spatial walk-off plate (SWP) polarizer is either grown or cut from a birefringent crystal in step 1960. At step 1970, the half-wave plate is etched to form periodic gaps in the half-wave plate layer and at step 1980 a second half-wave(HP) plate on a second poled magnetic garnet layer with a PBS layer on the opposite is etched with periodic gaps complementary to the gaps of the first half-wave plate. At step 1990 the two half-wave plates, each fixed to its own poled magnetic garnet layer and PBS layer, are mounted on either side of the spatial walk-off plate to form the optical circulator. One notable difference in this process is that, at step 1970, the half-wave plates are periodically etched to produce periodic gaps of desired dimension. In this process, conventional masking and etching techniques are used to obtain the desired etch pattern. It should also be appreciated that, although not shown in FIG. 17, the magnetic garnet may be periodically poled as discussed above with reference to FIG. 12.

It should be appreciated that reflective-type circulator embodiments of the present invention are fabricated in a similar fashion as is shown, for example, in FIGS. 12 and 17. One notable difference, of course, is the formation of the reflective element. In preferred aspects the reflective element is formed by deposition of dielectric multi-layers, or a thin reflective metallic film, on the garnet comprising the adjacent Faraday rotator element (e.g., Faraday rotator element 1160 in FIG. 11). Alternatively, a pre-formed dielectric multi-layer or mirror element may be attached as is well known. Another difference is that one of the two PBS modules, e.g. as shown at step 1470 in FIG. 12, is replaced with a reflector module including the reflection element and the adjacent Faraday rotator element.

It should also be appreciated that reflective type circulator device embodiments including Rochon Prism elements may also be fabricated using the techniques described herein.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An optical circulator device for coupling three or more optical fiber ports, the device comprising:

first and second refraction elements each having a refraction axis perpendicular to a propagation axis, wherein each refraction element is arranged so that light traveling in a forward direction parallel to the propagation axis and having a first linear polarization orientation is refracted by a first angle relative to the refraction axis along a refraction plane defined by the propagation and refraction axes, and light traveling in a forward direction parallel to the propagation axis and having a second linear polarization orientation perpendicular to the first polarization orientation is refracted by a second angle along the refraction plane opposite the first angle, wherein the first and second refraction elements are arranged opposite each other relative to the propagation axis, with anti-parallel refraction axes and with parallel refraction planes so that light refracted by one refraction element is refracted back parallel to the propagation axis by the other refraction element;

first and second polarization orientation elements coupled to opposite ends of the first and second refraction elements, respectively, the first and second polarization orientation elements each including a Faraday rotator element and a bi-layer waveplate film deposited thereon; and first and second polanzatiofl beam splittina (PBS) films deposited on said first and second polarization orientation elements, respectively, wherein the end face of each of the first and second PBS films opposite the polarization orientation elements defines one or more port coupling regions each for coupling light signals from an optical fiber port, wherein the first and second PBS films are dimensioned and arranged so as to split a light signal in a forward direction into two parallel beams of light linearly polarized perpendicular to each other, and to combine parallel beams of light linearly polarized perpendicularly to each other in the reverse direction into a single beam of light;

wherein the first polarization orientation element is arranged with respect to the first refraction element and the first PBS film so as to orient the polarization of both of the parallel light beams of a first optical signal propagating alone a forward direction from a first port coupling region on the first PBS film parallel to the first linear polarization orientation so that both beams are refracted by the first angle by the first refraction element, and to orient the polarization of two beams linearly polarized parallel to each other propagating in the reverse direction so that they are polarized perpendicular to each other; and wherein the second polarization orientation element is arranged with respect to the second refraction element and the second PBS film so as to orient the polarization of both of the parallel light beams of a second optical signal propagating along a forward direction from a second port coupling region on the second PBS film parallel to the second linear polarization orientation so that both beams are refracted by the second angle by the second refraction element, and to orient the polarization of two beams linearly polarized parallel to each other propagating in the reverse direction so that they are mutually perpendicular;

whereby the first optical signal passes from the first port coupling region to the second port coupling region, and the second optical signal passes from the second port coupling region to a third port coupling region.

2. The device of claim 1, wherein each of the first and second refraction elements includes a Wollaston Prism element.

3. The device of claim 1, wherein the first and second polarization orientation elements each consists of a Faraday rotator element having two or more reversed magnetic domains arranged such that the states of polarization of the two parallel light beams of an optical signal are rotated in opposite directions.

4. The device of claim 1, wherein the first and second PBS films are deposited on the first and second Faraday rotator elements, respectively, such that the first and second waveplate films are coupled to the first and second refraction elements, respectively.

5. The device of claim 1, wherein the first and second PBS films are deposited on the first and second waveplate films, respectively, such that the first and second Faraday rotators are coupled to the first and second refraction elements, respectively.

6. The device of claim 1, wherein each of the first and second Faraday rotator elements has two or more reversed magnetic domains, and wherein each is arranged such that the states of polarization of the two parallel light beams of an optical signal are rotated in opposite directions.

7. The device of claim 1, wherein each of the first and second Faraday rotator elements is uniformly poled such that the states of polarization of the two parallel light beams of an optical signal are rotated in the same direction, wherein one or more portions of each of the first and second waveplate films has been removed, and wherein each waveplate film is arranged and dimensioned such that the state of polarization of only one of the two parallel light beams of an optical signal is rotated.

8. The device of claim 7, wherein the first and second PBS films are arranged such that the optic axis of each points in a direction that is approximately 45° relative to the propagation axis and approximately 45° relative to a third axis that is perpendicular to both the propagation and refraction axes.

9. The device of claim 7, wherein the first and second PBS films are arranged such that the optic axis of each points in a direction that is approximately 45° relative to the propagation axis and in the plane defined by the propagation axis and a third axis perpendicular to both the propagation and refraction axes.

10. The device of claim 1, wherein the first and second refraction elements are arranged relative to each other such that the center-to-center spacing of port coupling regions on each of the first and second PBS films is between about 100 $\mu$m and about 400 $\mu$m.

11. The device of claim 1, wherein each of the first and second PBS films is deposited using a source material selected from the group consisting of Silicon (Si), and Ge.

12. The device of claim 1, wherein each of the first and second polarization orientation elements includes a Faraday rotator element formed in part by depositing a magnetic garnet film on a non-magnetic substrate.

13. The device of claim 12, wherein the garnet film is deposited using liquid phase epitaxy (LPE).

14. The device of claim 12, wherein the garnet film is grown in the form: $RE1_a RE2_b Bi_{3-a-b} Fe_{5-c-d} M1_2 M2_d O_{12}$, where RE1 and RE2 are each selected from the group consisting of La, Pr, Nd, Sm, Eu, Gd, Tb, Dy, Ho, Yb, and Lu, and wherein M1 and M2 are each selected from the group consisting of Ga, Al, In and Sc.

15. The device of claim 12, wherein each of the first and second Faraday rotator elements has two or more reversed magnetic domains arranged such that the states of polarization of the two parallel light beams of an optical signal are rotated in opposite directions.

16. The device of claim 12, wherein each of the first and second Faraday rotator elements has a substantially uniform magnetic profile such that the states of polarization of the two parallel light beams of an optical signal are rotated in the same direction.

17. The device of claim 12, wherein the thickness of each waveplate film along the propagation axis is between about 5 $\mu$m and about 20 $\mu$m.

18. The device of claim 12, wherein one or more portions of each of the first and second waveplate films have been removed, and wherein each of the first and second waveplate films are arranged such that the state of polarization of only one of the two parallel light beams of an optical signal is rotated by each waveplate film.

19. The device of claim 1, wherein the thickness of each PBS film along the propagation axis is between about 0.25 mm and about 0.5 mm.

* * * * *